(12) United States Patent
Rowe

(10) Patent No.: US 8,763,917 B2
(45) Date of Patent: Jul. 1, 2014

(54) MACHINE-READABLE SYMBOLS

(75) Inventor: Robert K. Rowe, Corrales, NM (US)

(73) Assignee: Lumidigm, Inc., Albuquerque, NM (US)

( * ) Notice: Subject to any disclaimer, the term of this patent is extended or adjusted under 35 U.S.C. 154(b) by 0 days.

(21) Appl. No.: 13/237,013

(22) Filed: Sep. 20, 2011

(65) Prior Publication Data

US 2012/0067958 A1    Mar. 22, 2012

Related U.S. Application Data

(60) Provisional application No. 61/384,579, filed on Sep. 20, 2010, provisional application No. 61/392,874, filed on Oct. 13, 2010, provisional application No. 61/407,840, filed on Oct. 28, 2010, provisional application No. 61/429,977, filed on Jan. 5, 2011.

(51) Int. Cl.
*G06K 19/00* (2006.01)
*G06K 19/06* (2006.01)

(52) U.S. Cl.
USPC .......................................... 235/494; 235/487

(58) Field of Classification Search
CPC .............. G06K 7/1414; G06K 7/1417; G06K 19/06009; G06K 19/06037; G06K 19/06028; G06K 19/06046; G06K 19/06056
USPC ................... 235/454, 487, 491, 494
See application file for complete search history.

(56) References Cited

U.S. PATENT DOCUMENTS

| | | | | |
|---|---|---|---|---|
| 5,359,184 | A * | 10/1994 | Froehlich et al. | 235/454 |
| 5,576,528 | A * | 11/1996 | Chew et al. | 235/469 |
| 6,398,117 | B1 * | 6/2002 | Oakeson et al. | 235/494 |
| 6,595,427 | B1 * | 7/2003 | Soni et al. | 235/491 |
| 7,394,919 | B2 | 7/2008 | Rowe et al. | |
| 7,460,696 | B2 | 12/2008 | Rowe | |
| 7,539,330 | B2 | 5/2009 | Rowe | |
| 7,562,820 | B2 | 7/2009 | Muramatsu | |
| 7,619,746 | B2 | 11/2009 | De Lega | |
| 7,801,338 | B2 | 9/2010 | Rowe | |
| 7,831,072 | B2 | 11/2010 | Rowe | |
| 7,835,554 | B2 | 11/2010 | Rowe | |
| 8,165,357 | B2 | 4/2012 | Rowe | |
| 8,229,185 | B2 | 7/2012 | Ennis et al. | |
| 2007/0009175 | A1 | 1/2007 | Lim et al. | |
| 2008/0128501 | A1 | 6/2008 | Thebault et al. | |
| 2008/0191024 | A1 | 8/2008 | Napper et al. | |
| 2010/0246902 | A1 | 9/2010 | Rowe et al. | |

(Continued)

FOREIGN PATENT DOCUMENTS

WO    2007128452 A2    11/2007

OTHER PUBLICATIONS

Applicant: Lumidigm, Inc. Notification of Transmittal of the International Search Report and the Written Opinion of the International Searching Authority, or the Declaration. International Application No. PCT/US2011/052365. Filing Date: Sep. 20, 2011.

*Primary Examiner* — Jamara Franklin

(74) *Attorney, Agent, or Firm* — Marsh Fischmann & Breyfogle LLP; Kent A. Fischmann

(57) ABSTRACT

A variety of forms of machine-readable symbols are disclosed, as well as methods and systems of constructing machine-readable symbols, methods and systems of acquiring machine-readable symbols, and methods and systems of decoding machine-readable symbols.

16 Claims, 29 Drawing Sheets

(15 of 29 Drawing Sheet(s) Filed in Color)

(56) References Cited

U.S. PATENT DOCUMENTS

| | | |
|---|---|---|
| 2011/0085708 A1 | 4/2011 | Martin et al. |
| 2011/0163163 A1 | 7/2011 | Rowe |
| 2011/0165911 A1 | 7/2011 | Rowe |
| 2011/0211055 A1 | 9/2011 | Martin et al. |
| 2012/0025951 A1 | 2/2012 | Rowe |

* cited by examiner

MACHINE-READABLE SYMBOLS

CROSS-REFERENCE TO RELATED APPLICATIONS

This application is a nonprovisional of, and claims the benefit of the filing date of, each of the following provisional applications: U.S. Prov. Pat. Appl. No. 61/384,579, entitled "METHODS AND SYSTEMS TO MAKE, IMAGE AND PROCESS BARCODES AND OTHER MACHINE READABLE DATA," filed Sep. 20, 2010 by Robert K. Rowe, Alex Litz, and Ryan Martin; U.S. Prov. Pat. Appl. No. 61/392,874, entitled "OPTICAL MULTIPLEXING FOR BARCODE ACQUISITION," filed Oct. 13, 2010 by Robert K. Rowe and Ryan Martin; U.S. Prov. Pat. Appl. 61/407,840, entitled "METHOD OF STATISTICAL INTERPRETATION OF BARCODE IMAGES," filed Oct. 28, 2010 by Robert K. Rowe; and U.S. Prov. Pat. Appl. No. 61/429,977, entitled "COPY-RESISTANT TOKENS," filed Jan. 5, 2011 by Robert K. Rowe. The entire disclosure of each of these provisional applications is incorporated herein by reference in their entireties.

This application is related to the following concurrently filed, commonly assigned applications: U.S. patent application Ser. No. 13/236,953, entitled "MACHINE-READABLE SYMBOLS" by Robert K. Rowe; U.S. patent application Ser. No. 13/237,074, entitled "MACHINE-READABLE SYMBOLS" by Robert K. Rowe; and U.S. patent application Ser. No. 13/237,137, entitled "MACHINE-READABLE SYMBOLS" by Robert K. Rowe.

BACKGROUND OF THE INVENTION

This application relates generally to machine-readable symbols. More specifically, this application relates to methods and systems for fabricating, acquiring, and processing machine-readable symbols.

Since their origins in the late 1940's, barcodes and other types of machine-readable symbols have become ubiquitous. They are used in a wide range of applications to identify items in a way that may be understood by a variety of devices. Perhaps the most common example is the use of barcodes to identify retail products with the Global Trade Item Numbers ("GTIN") or Universal Product Code ("UPC") symbologies. These systems are examples where machine-readable symbols are used to identify generally fungible products for sale, with information encoded in the barcode to identify characteristics of products being sold, including such information as an item number, a weight of the product, a price for the product, and the like. Other barcode symbology uses that identify classes of products are implemented in any number of inventory-based systems, such as in factories that use barcodes to track component supplies and to automate reordering when supplies of certain components are near depletion.

Other types of systems assign unique barcodes to items rather than assigning barcodes to groups of items. One of the more important of these is the GS1 supply-chain system, which implements a series of standards that are designed to improve supply-chain management. In combination with other standards, barcode standards are promulgated in this system to allow unique identification of products in manufacturing and other contexts. The Air Transport Association ("AITA") implements a system of barcodes on aircraft boarding passes, a system that is tied to security and safety applications, and the use of barcodes in managing access to entertainment events have also become increasingly widespread.

Barcodes are also used for unique identification of living beings, notably in biological research in which animals are tagged with barcodes to track individual the behavior of individual animals, particularly in large-population environments where individual identification of the animals is otherwise difficult (such as for the tracking of behavior of bees in hives). Barcodes have also been used for the identification of human beings, such as in medical environments where wristbands having symbols that encode patient information are deployed.

While many deployments of machine-readable symbols are effected by attaching labels to items with printed barcodes, there are other implementations in which the symbols are incorporated directly onto the part being marked. This may be accomplished by such techniques as laser etching, chemical etching, dot peening, casting, machining, and other operations, and is particularly common in supply-chain applications.

The very ubiquity of machine-readable symbols means that there are many different circumstances in which the symbols may be difficult to read reliably: this may be because, among other reasons, the symbol itself is of poor quality; because the shape, color, or configuration of an object on which it is instantiated presents imaging challenges; or the environment in which it is to be read presents challenges. While a number of processing techniques have been developed to address such difficulties, many of these remain ineffective under a variety of conditions so that a need remains in the art for improved acquisition techniques.

In addition, many applications for machine-readable symbols introduce the risk of a variety of types of fraud. Software is widely available, both on the Internet and through other commercial avenues, that allow individuals to generate barcode symbologies that may be improperly affixed to items. Fraud can also be committed by copying barcodes and inappropriately attaching them to items so that the items are deliberately misidentified. Such copying is, moreover, not limited to the copying of barcodes to be attached to items but can also be committed with direct-part marks that are incorporated directly on items by examining and reproducing the marks improperly. Such fraud can not only have significant financial consequences, but can also have the effect of interfering with supply-chain monitoring and scenarios can even be envisaged in which such copying is used to commit batteries and other physical crimes against individuals through the deliberate mislabeling of medications, medical parts, and even the patient himself. There is accordingly also a need in the art to enhance the security of machine-readable symbols.

SUMMARY

Embodiments of the invention are directed to a variety of forms of machine-readable symbols, to methods and systems of constructing machine-readable symbols, to methods and systems of acquiring machine-readable symbols, and to methods and systems of decoding machine-readable symbols.

In a first set of embodiments, methods and systems are provided for acquiring an image of a machine-readable symbol. The machine-readable symbol is illuminated with a plurality of illumination sources disposed relative to the machine-readable symbol to define a plurality of distinct illumination geometries. For each illumination geometry, a respective raw image of the machine-readable symbol is obtained. At least one of the respective raw images includes a dark region. Information from the respective raw images is combined to generate a single image of the machine-readable symbol.

In some of these embodiments, the machine-readable symbol comprises a printed barcode, but may take other forms in alternative embodiments.

There are various ways in which information from the respective raw images may be combined. For example, a nonminimum pixel may be selected from each of the respective raw images. A bilateral filter may be applied to at least one of the respective raw images. A pixel intensity may be averaged across the respective raw images. Information from the respective raw images may be uniformly or nonuniformly weighted in different embodiments, such as by applying a nonuniform weighting in accordance with a determination of a quality for each of the respective raw images. An intrinsic characteristic of on object on which the machine-readable symbol is instantiated may be estimated, such as by processing the raw images with a photometric stereo technique to derive a measure of surface topography and reflectance of the object.

In certain embodiments, the illumination sources define a balanced arrangement in which illumination portions of the respective raw images vary between illumination conditions in a complementary fashion.

In a second set of embodiments, methods and systems are also provided of acquiring an image of a machine-readable symbol. The machine-readable symbol is illuminated with a plurality of illumination sources having different illumination spectra. An image of the illumination machine-readable symbol is collected, and chromatic components of the collected image are separated.

The machine-readable symbol may comprise a printed barcode in some embodiments, but may take other forms also.

The plurality of illumination sources may be disposed relative to the machine-readable symbol to provide a plurality of distinct illumination geometries, such as by having at least two of the illumination sources disposed at different azimuthal and/or elevation angles relative to the machine-readable symbol.

In some instances, illumination from at least one of the illumination sources is polarized so that the method further comprises separating polarization components of the collected image.

The illumination sources may also take different forms in different embodiments. In one embodiment, at least one of the illumination sources provides diffuse illumination, while in another embodiment, at least one of the illumination sources provides substantially directional illumination. The illumination sources might also provide a plurality of illumination wavelengths, but with different illumination sources providing the illumination wavelengths at different relative intensities. In another embodiment, each illumination source is instead substantially monochromatic.

A third set of embodiments provides a handheld device and method of acquiring an image of a machine-readable symbol with the handheld device. A plurality of raw images of the machine-readable symbol taken with the handheld device are received. The plurality of raw images are registered, and information from the registered images is combined to generate a single image of the machine-readable symbol.

In some of these embodiments, the machine-readable symbol comprises a printed barcode, while in others it comprises a direct-part mark. The various types of combinations of information from the images may be performed in various embodiments. The handheld device may comprise a mobile telephone or a tablet computer, among others.

A fourth set of embodiments provides a multi-mode machine-readable symbol. A first machine-readable symbol is instantiated on an object at a first location and is readable by a first methodology. A second machine-readable symbol is instantiated on the object at a second location that overlaps the first location and is readable by a second methodology different from the first methodology.

In some instances, a third machine-readable symbol is instantiated at a third location that overlaps the first and second locations and is readable by a third methodology different from the first and second methodologies.

In specific embodiments, the second machine-readable symbol comprises a pattern of marks formed in a surface of the object. The first machine-readable symbol may comprise a barcode printed on a surface of the object or on a conformal layer applied over the surface of the object.

In a fifth set of embodiments, methods and systems are provided for decoding a machine-readable symbol configured as a set of marks form in a surface of an object. A presence or absence of a mark in each cell of an array of cells designates a binary state of the cell. An image of the machine-readable symbol is acquired. Cells of the array are identified from the acquired image. Reference cells of the array are evaluated in accordance with a reference standard for the machine-readable symbol to identify optical characteristics consistent with the presence or absence of a mark in the reference cells. Nonreference cells of the array are classified in accordance with the identified optical characteristics to determine the presence or absence of a mark in the nonreference cells. Classifications of the nonreference cells are compiled into a binary grid, which may then be decoded.

In some embodiments, the image of the machine-readable symbol may be acquired by illuminating the machine-readable symbol with a plurality of illumination sources having different illuminating spectra, with the reference cells being evaluated and the nonreference cells being classified by separating chromatic components of the acquired image. In some cases, the illumination sources are disposed relative to the machine-readable symbol to provide a plurality of distinct illumination geometries, such as by having different azimuthal or elevation angles. The illumination sources may also provide diffuse or directional illumination, and may be substantially monochromatic.

The reference cells may be evaluated and the nonreference cells classified by determining a statistical measure of pixel values within the cells, such as a mean or standard deviation of the pixel values.

In a sixth set of embodiments, a copy-resistant symbol is provided as a machine-readable symbol instantiated on a substrate. The machine-readable symbol represents a combination of substantive and encrypted security information. A decryption of the encrypted security information identifies a security feature of the copy-resistant symbol identifiable through optical imaging of the copy-resistant symbol.

The substrate or the machine-readable symbol may comprise an optically variable material, and the machine-readable symbol may be printed over the substrate or incorporated within the substrate. The security feature may comprise an identifying mark comprised by the substrate or comprised by the machine-readable symbol. For example, the security feature may comprise an angular relationship of the identifying mark and a reference comprised by the copy-resistant symbol or may comprise a spatial relationship between the identifying mark and a reference comprised by the copy-resistant symbol.

The encrypted security information may be encrypted according to a symmetric or asymmetric encryption algorithm. In some embodiments, the copy-resistant symbol further comprises a supplementary layer distinct from the substrate and the machine-readable symbol, with the security feature comprising an identifying mark comprised by the supplementary layer.

Such copy-resistant symbols may be read by optically acquiring the machine-readable symbol from the copy-resistant symbol and decoding it to derive a message. A portion of the message may be decrypted by applying a decryption key, and determining a security feature from the decrypted portion of the message. Physical presence of the security feature on the copy-resistant symbol may then be confirmed.

BRIEF DESCRIPTION OF THE DRAWINGS

A further understanding of the nature and advantages of the present invention may be realized by reference to the remaining portions of the specification and the drawings, wherein like reference labels are used through the several drawings to refer to similar components. In some instances, reference labels are followed with a hyphenated sublabel; reference to only the primary portion of the label is intended to refer collectively to all reference labels that have the same primary label but different sublabels.

The patent or application file contains at least one drawing executed in color. Copies of this patent or patent application publication with color drawings will be provided by the Office upon request and payment of the necessary fee.

DETAILED DESCRIPTION OF EXEMPLARY EMBODIMENTS

1. Introduction

Figure 1:
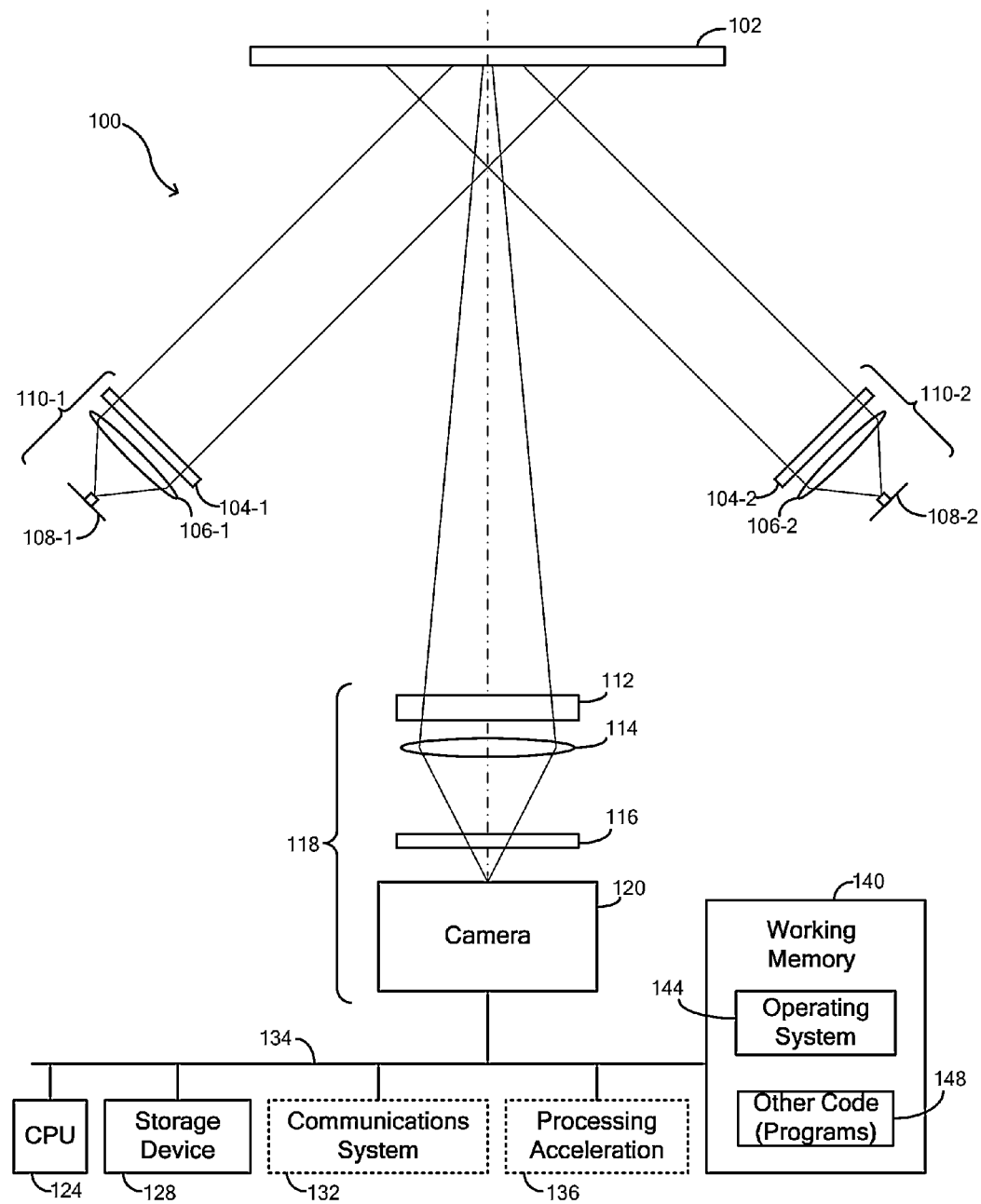
FIG. 1 is a schematic illustration of one type of optical reader that may be used in embodiments of the invention for machine reading of symbols.

Embodiments of the invention are directed to "machine-readable symbols," which are symbols that comprise one or more marks capable of being acquired by an imaging system, with the resulting image interpreted by a computational system. Barcodes are examples of machine-readable symbols, and while references are sometimes made specifically to barcodes in this disclosure for purposes of illustration, it is to be understood that embodiments of the invention are relevant to any type of machine-readable symbol. Furthermore, in implementations where barcodes are used, the invention is not limited by the symbology used in generating the barcodes and may accommodate any symbology. Examples of such symbologies include one-dimensional symbologies such as Codabar, Code 11, Code 128, Code 32, Code 39, Code 93, EAN-13, EAN-8, EAN-99, EAN-Velocity, Industrial 2 of 5, Interleaved 2 of %, ISBN, UPC-A, UPC-E, and other symbologies. Further examples include two-dimensional symbologies such as Aztec Code, Code 16K, PDF417, Compact PDF417, Micro PDF417, Macro PDF417, DataMatrix, QR Code, Semacode, and other formats. The invention may also accommodate both monochromatic and color barcode symbologies, including, for example, the High Capacity Color Barcode ("HCCB") symbology. The inclusion of color in barcode symbology is one example of a more general class of multidimensional barcodes that encode information using nonspatial dimensions, and other such multidimensional barcodes that use nonspatial dimensions are also accommodated in embodiments of the invention.

Other examples of machine-readable symbols that may be used in embodiments of the invention include machine-readable text, human-readable text that is amenable to optical character recognition ("OCR") techniques for its machine interpretation, magnetic-ink characters written according to the magnetic-ink character recognition ("MICR") format described in the International Organization for Standardization ("ISO") publication ISO 1004:1995, and other similar types of symbols.

The machine-readable symbol is generally instantiated on a substrate, although the form of instantiation may take a variety of forms in different embodiments, frequently depending on the material of the substrate and on the manner in which the symbol is to be associated with an item. Consider those instances where the symbol is to be associated with an item by incorporating the symbol directly on the item. If the item comprises a surface on which ink will adhere, the symbol may be printed on the item using any printing techniques conventional for such surfaces. Alternatively, the symbol may be incorporated as part of the item by modification of a surface of the item using such techniques as laser etching, chemical etching, dot peening, casting, machining, and the like. Such techniques may also be used when the symbol is associated with the item through the use of a separate label, which may be affixed or attached to the item, or which may in some embodiments be positioned distinct from the item in a way manner that makes the association clear. An example of such an instance would be a barcode label affixed to a shelf on which the item rests.

The combination of substrate and machine-readable symbol may further be accompanied by a supplementary layer, examples of which include laminate, coating, or other covering layers that are generally coextensive with the symbol although layers that are not coextensive may also be provided in some embodiments.

Conventional ways of acquiring information from machine-readable symbols begin by acquiring a digital image of an area of the object containing the symbol using an imager, commonly a complementary metal-oxide-semiconductor ("CMOS") imager or a charge-coupled device ("CCD"). In some cases, auxiliary lighting is also used to illuminate the object during image acquisition.

Generally, the digital image of the symbol is then processed by specialized software that performs multiple tasks. First, the software analyzes the image to determine whether a machine-readable symbol is present or not. If present, the software determines the exact location and orientation of the symbol. The software may then apply various spatial transformations, image enhancements and other processing to the symbol, after which the individual elements of the symbol (which are usually binary) are extracted and decoded. Although many symbols have error correction built into them, the techniques may still be unable to process and decode the symbol because the overall image quality is poor.

One way of addressing poor-quality symbol images uses acquisition of multiple images under multiple optical conditions, particularly through the use of multiple illumination angles and/or imaging angles. Each of the images may then be analyzed to find one that is sufficiently good to decode. But in some situations, one example of which occurs when the symbol is instantiated on a round object, no one illumination condition is sufficiently able to illuminate the entire symbol so that no one image of the symbol is adequate for decoding.

Another variant uses acquisition of two images of a machine-readable symbol illuminated or imaged from different angles, in which the areas of specular reflection change between differently illuminated images. This technique attempts to accommodate for the fact that the specular reflection may obscure the local symbol features. The resulting images are then combined by performing a pixel-by-pixel minimum operation. While such a technique may produce a readable image where each individual symbol image is unreadable, the procedure requires both images to be adequately illuminated over the entire region so that a "minimum" operation applied to a dark region on one of the two images so processed will cause a dark region in the resulting image.

A further variation relies on collection of multiple symbol images under different illumination or imaging conditions so that a subset of the symbol images may be extracted and stitched together in an attempt to derive a single readable symbol. This method requires the symbol position to be properly determined so that contiguous subsets of symbol features may be extracted, processed, and analyzed to determine their readability and to combine the readable subsets into a stitched barcode that is then hopefully readable in its entirety. Processing of individual symbol elements is computationally intensive and specialized for each type of barcode or other machine-readable symbol encountered. As with the previous method, only a single raw image is used to define each point or barcode element of the composite image, which makes the method sensitive to cases where no one raw image has adequate signal in certain portions of the symbol.

Multiple images of a machine-readable symbol may also be collected under multiple imaging conditions by using a single imager to collect a sequence of images, each illuminated under a different condition, such as with different illumination angles. Such sequential collection may be problematic for rapidly moving objects. If it is possible to align such images at all, the required image processing may be quite complicated, time-consuming, and error-prone. Alternatively, multiple simultaneous images may be acquired using multiple imagers with different imaging characteristics, such as different imaging angles. Such configurations may be large and costly due to the multiple imaging subsystems. Further, such systems are limited to a single set of illumination conditions that are used to illuminate the object when the multiple images are so acquired.

Multiple images of a machine-readable symbol may be collected simultaneously under multiple illumination conditions using a single color imager that is used to collect images due to the multiple illumination conditions. Each illumination condition corresponds to a distinct monochromatic wavelength that, in turn, corresponds to a distinct color channel. As such, such a prior-art technique teaches establishing a one-to-one correspondence between illumination geometry and a single color channel.

In addition to the term "machine-readable symbol" provided above, certain terminology is used herein in accordance with precise definitions.

"Azimuth angle" refers to the angle in a plane perpendicular to an imaging axis. The azimuth angle is measured from some defined point or, if not stated, the measurement point may be arbitrary, but the relative azimuth angles between two or more points may be operative.

"Elevation angle" refers to the angle in a plane containing an imaging axis. This angle is measured from the imaging axis. The 180° ambiguity associated with the measurement may be obvious from context or may be further defined if critical to the specific reference.

"Hologram" refers to a conventional hologram of all types, including white-light holograms. The term also refers to other material and material structures that change optical properties as a function of illumination or imaging angles. For example, a "hologram" includes optically variable inks that change color as a function of illumination and/or imaging angle. The term also encompasses a variety of diffractive and refractive structures that change spectral characteristics as a function of illumination and/or imaging angle. The term also encompasses polarization-sensitive material whole reflectivity changes as a function of the polarization angle of the light incident on it and/or the polarization angle through which the material is viewed.

"Illumination geometry" refers to the spatial characteristics of the illumination light. In a case where the light is highly directional, "illumination geometry" refers to the elevation and azimuth angles of an illumination beam. Such light might have an elevation angle near zero degrees (or 180°), which is also referred to sometimes as being "on-axis." Such directional light might also have an elevation substantially different than zero degrees (or 180°), in which case the azimuth angle is also used to specify the illumination geometry. Directional light may be collimated such that all illumination angles across the beam profile are substantially the same. Alternatively, the directional light may be converging or diverging relative to the axis of illumination. Further, the directional light may comprise some weighted combination of collimated, converging, and diverging beams with the same or different illumination angles. Alternatively, the light may be nondirectional or diffuse, with no preferred directionality. The light may have some complex relationship between illumination directions, spatial distributions, and intensities. In the case of broadband or multiband (i.e., multiple different discrete wavelength) illumination light, the relationship between illumination directions, spatial distributions, and intensities may also vary as a function of wavelength. In some cases, such as with transparent or translucent objects, lighting may be provided on the side of the object opposite the side that is imaged. All such characteristics of light also fall within the scope of the term "illumination geometry," as does any mixture of directional and diffuse lighting.

A "multi-imaging" sensor refers to a sensor that comprises at least a single imager and a mechanism to collect a plurality of images of an object during a single measurement session under different optical conditions. The different optical conditions may be different illumination angles, different degrees of illumination diffusivity (i.e., directional lighting versus diffuse light), different illumination wavelengths, different illumination polarization conditions, different imaging angles, different imaging polarizations, different imaging exposure times, and other such differences of the sort. The imager or imagers may be monochromatic or they may incorporate color filter arrays or other known mechanisms to collect different-wavelength images simultaneously. Thus, within the scope of the present invention, a plurality of images may be collected simultaneously using color filter arrays and other such multiplexing techniques.

"Illumination spectrum" refers to the wavelength characteristics and/or other characteristics of the light used to illuminate the object. The distribution of wavelengths in a particular illumination spectrum may comprise a plurality of distinct wavelengths or a continuum of wavelengths. The illumination spectra from two different illumination sources are said to be distinct if the relative intensities of the wavelengths in the first illumination spectrum are measurably different than the relative intensities in the second illumination spectrum. Thus, two illumination spectra may be distinct even though some portion (or all) of the same wavelengths of light are present in the two spectra. Similarly, if other optical characteristics of two illumination spectra are measurably different (e.g., polarization, spatial distribution, angular distribution, etc.), the two spectra are also said to be distinct whether or not the relative intensities of the illumination wavelengths are the same.

An "optically multiplexed" sensor refers to a multi-imaging sensor that is able to simultaneously collect a plurality of images of an object during a single measurement session under different optical conditions by coupling two optical parameters in some way. For example, different illumination geometries may be coupled with different illumination spectra such that a color imager (which intrinsically distinguishes between different spectra) is able to be used as a mechanism for distinguishing between different illumination geometries. In a similar way, polarization may be coupled with illumination spectra to enable the distinction between different polarization conditions based on different spectra characteristics. Also within the scope of the present invention, a polarization-sensitive imager may be used for optical multiplexing by coupling another characteristic such as illumination spectra, illumination geometry, etc., to polarization state. Other similar coupling and detection of optical characteristics also fall within the scope of the present invention.

"Optically variable" material refers to a material that responds to changes in illumination characteristics with a measurable change in an optical property. Examples of optically variable materials thus include holographic materials, materials that incorporate diffraction gratings, optically variable inks and pigments, iridescent coatings, and the like.

A "security feature" refers to an identifying marking and may take the form of words, symbols, patterns, colors, textures, fiducial marks, surface finishes, and the like. In some instances, a security feature is unique to an item associated with a machine-readable symbol. This may particularly be the case when the substrate is comprised by the item so that the identifying marking is produced on the item as a consequence of random outcomes in the manufacturing process used to make the item. But even when the manufacturing process has predictable outcomes in producing features, such features may be used as a security feature.

2. Acquisition a. Optically Multiplexed Acquisition

Machine-readable symbols of the types defined above may be read by a number of different imaging devices according to different embodiments of the invention. One such device is illustrated schematically in FIG. 1.

The imaging device 100 shown in FIG. 1 includes an optical window 102 through which images of the machine-readable symbol may be collected for imaging by a digital imaging system 118. In this configuration, the focal plane of the imaging system 118 is substantially coincident with the exterior surface of the optical window 102. In some embodiments, the optical window 102 may be omitted or the position of the window could be displaced from the focal plane. Examples of devices in which the optical window is omitted are provided with FIGS. 2 and 4 below. Illumination systems 110 may be provided as part of a mechanism for collecting the images. In the illustrated embodiment, the illumination systems 110 comprise light sources 108 and optics that interact with the optics of the digital imaging system 118. The number of illumination sources 108 may conveniently be selected to achieve certain levels of illumination, to meet packaging requirements, and to meet other structural constraints of the imaging device 100.

In operation, illumination passes from the light sources 108 through illumination optics 106 that shape the illumination to a desired form, such as in the form of flood light, light lines, light points, and the like. The light sources 108 may be narrowband sources such as monochromatic LED's or laser diodes, or may be broadband sources such as white-light LED's or incandescent sources. In cases where the light sources 108 comprise a series of sources, the series of sources may be of the same wavelength or different wavelengths. The different sources 108 may be configured identically or they may differ from each other.

The illumination optics 106 are shown for convenience as consisting of a lens but may more generally include any combination of one or more lenses, one or more mirrors, optical windows, and/or other optical elements. The illumination optics 106 may also comprise a scanner mechanism or a spatial light modulator (not shown) to scan the illumination light in a specified one-dimensional or two-dimensional pattern. The illumination optics may also comprise variable-focus elements such as liquid lenses, deformable mirrors, and other such devices to accommodate different object distances. The light source 108 may comprise a point source, a line source, an area source, or may comprise a series of such sources in different embodiments.

After the light passes through the illumination optics 106, it passes through the window 102 to illuminate the machine-readable symbol so that reflected light is directed to the digital imaging system 118, which comprises detection optics 114 adapted to focus the light reflected from the symbol onto the array. For example, the detection optics 114 may comprise a lens (including liquid lenses and other variable-focus lenses), a mirror (including deformable mirrors and other variable-focus mirrors), a pinhole, or a combination of such optical elements or other optical elements known to those of skill in the art. In some embodiments, the detection optics 114 may provide for variable positions of the focal plane using auto-focus methods known in the art.

Both the illumination systems 110 and the digital imaging system 118 may additionally comprise optical polarizers 104 and 112. The polarizers 104 and 112 may be linear or circular, or a combination of the two.

The digital imaging system 118 may also comprise a color filter array 116, which may in some instances be incorporated as part of the camera 120. The color filter array 116 may conveniently comprise a red-green-blue filter array in the well-known Bayer pattern or in other patters. In some instances, the filter elements may function to transmit wavelengths that differ from the standard red-green-blue wavelengths, may include additional wavelengths, and/or may be arranged in a pattern that differs from the Bayer pattern.

The imaging-device layout and components may advantageously be selected to minimize the direct reflection of the illumination into the digital imaging system 118. In one embodiment, such direct reflections are reduced by relatively orienting the illumination and detection optics such that the amount of directly reflected light detected is minimized. For instance, the optical axes of the illumination optics 110 and the detection optics 118 may be placed at angles such that a mirror placed on the screen 102 does not direct an appreciable amount of illumination light into the detection system 118.

The camera 120 may be coupled electronically with elements of a computational system that aid in processing of images collected by the imaging device 100. In particular, hardware elements of such a computational system may be electrically coupled via bus 134, and may include a processor 124, a storage device 128, a processing acceleration unit 236 such as a DSP or special-purpose processor, and a memory 240. A communications system 114 may additionally be provided in those embodiments where the imaging device 100 is equipped for communication with a network In embodiments that include a communications system 114, it may comprise a wired, wireless, modem, and/or other type of interfacing connection and permits data to be exchanged with the network.

Software elements are shown as being currently located within working memory 140, including an operating system 124 and other code 148, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

Figure 2:
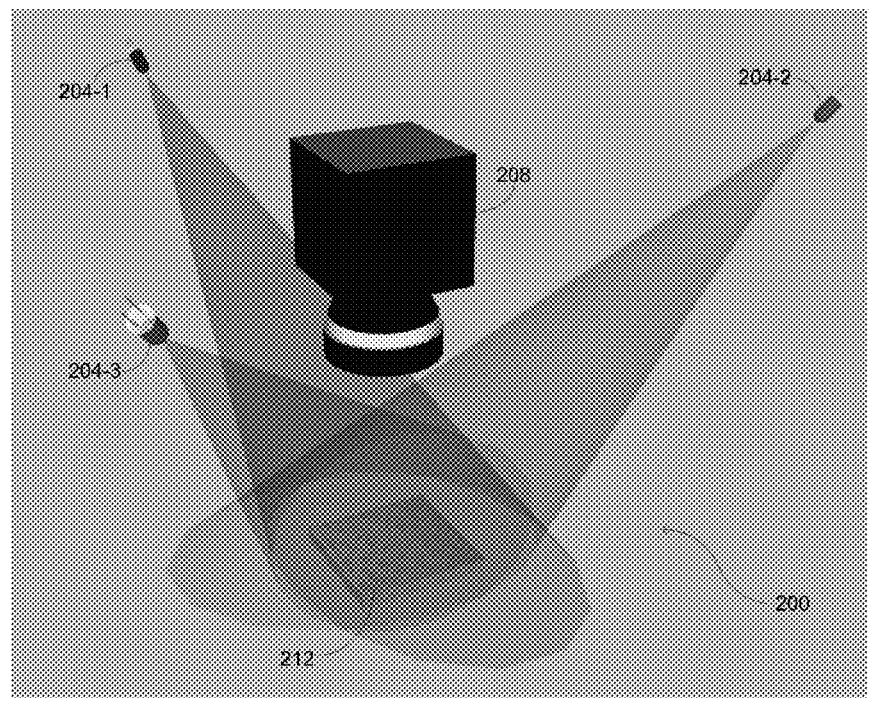
FIG. 2 provides a perspective view of an optical reader having three sources of illumination (COLOR)

In particular embodiments, the generic structure shown in FIG. 1 takes the form of an optically multiplexed multi-imaging sensor such as illustrated in FIG. 2. For example, such a sensor 200 can include a plurality of different illuminators 204 that illuminate a symbol 212 with different illumination spectra. A color imager 208 can be used to simultaneously collect images of the symbol while being illuminated with the different illuminators. The color imager 208 may comprise a color filter array such as a Bayer color filter array that separates the incident light into red, green, and blue components. The three illuminators 204 emit light with three distinctly different illumination spectra. In general, these three spectra may be different than the pass bands of the color filter array, and some or all of the spectra may significantly affect two or more of the color channels. For example, the illuminators 204 might appear to be white, orange, and teal. Also within the scope of the invention, any or all of the illuminators 204 may contain wavelengths in the ultraviolet and/or infrared bands that are also detectable by the imager 208.

As shown in FIG. 2, these illuminators 204 with distinct illumination spectra can be positioned at different azimuth angles about the imager 208 or symbol 212 and/or at different elevation angles. One or more of the illuminators 204 may also be a diffuse illuminator, a ring illuminator, a daylight illuminator, a dark-field illuminator, or other illumination geometries of the sort. The imager 208 can include a color filter array that allows it to collect different images of the symbol 212 simultaneously. The imager 208 may comprise a polarizer in one or more of the color channels. For example, the imager 208 may incorporate a linear polarizer or a circular polarizer in one or more color channels. One or more illuminators 204 may also incorporate a polarizer (linear, circular, etc.).

In some embodiments, a sensor can acquire a single image with three different illumination conditions: two directional illuminators with different azimuth angles and a single diffuse illuminator. Each illuminator in such an embodiment can provide light with different and distinct wavelengths or wavelength bands. When the machine-readable symbol comprises a printed barcode, the different illumination spectra may provide enhanced information content in order to detect and/or decode the barcode, but the configuration may be used for imaging of any machine-readable symbol, including direct-part marks.

Different illumination variations may be directional or diffuse and may vary in azimuth and/or elevation angles. Optical multiplexing methods can be used to multiplex polarization and other optical variations instead of, or in addition to, illumination geometry. For example, some of the illuminators may have linear or circular polarizers incorporated in the optical path. Some or all of the imager channels may have linear or circular polarizers incorporated in the optical path. In some cases, the optical axis of the polarizer for a particular illuminator may be oriented parallel to the polarizer in a particular imaging channel. In other cases, the optical axis of the polarizer for a particular illuminator may be oriented perpendicular to the polarizer in a particular imaging channel. Alternative color filter arrays such as four-color arrays (e.g., CYMW), vertical color filters, and the like, may be used instead of or in addition to Bayer color filter arrays. Alternatively, multiple monochromatic imagers combined with chromatic beam splitters may be used. An example of this is provided in FIG. 3, which shows a machine-readable symbol in the form of a two-dimensional barcode, and a series of beamsplitters 304. A first image results from interaction with the first beamsplitter 304-1, which redirects light having a wavelength λ less than a first threshold wavelength $w_1$; a second image results from interaction with the second beamsplitter 304-2, which redirects light having a wavelength λ less than a second threshold wavelength $w_2$; a third image results from interaction with the third beamsplitter 304-3, which redirects light having a wavelength λ less than a third threshold wavelength $w_3$; and a fourth image results from the remainder of the beam, which is left with wavelengths greater than the third threshold wavelength $w_3$.

Figure 4:
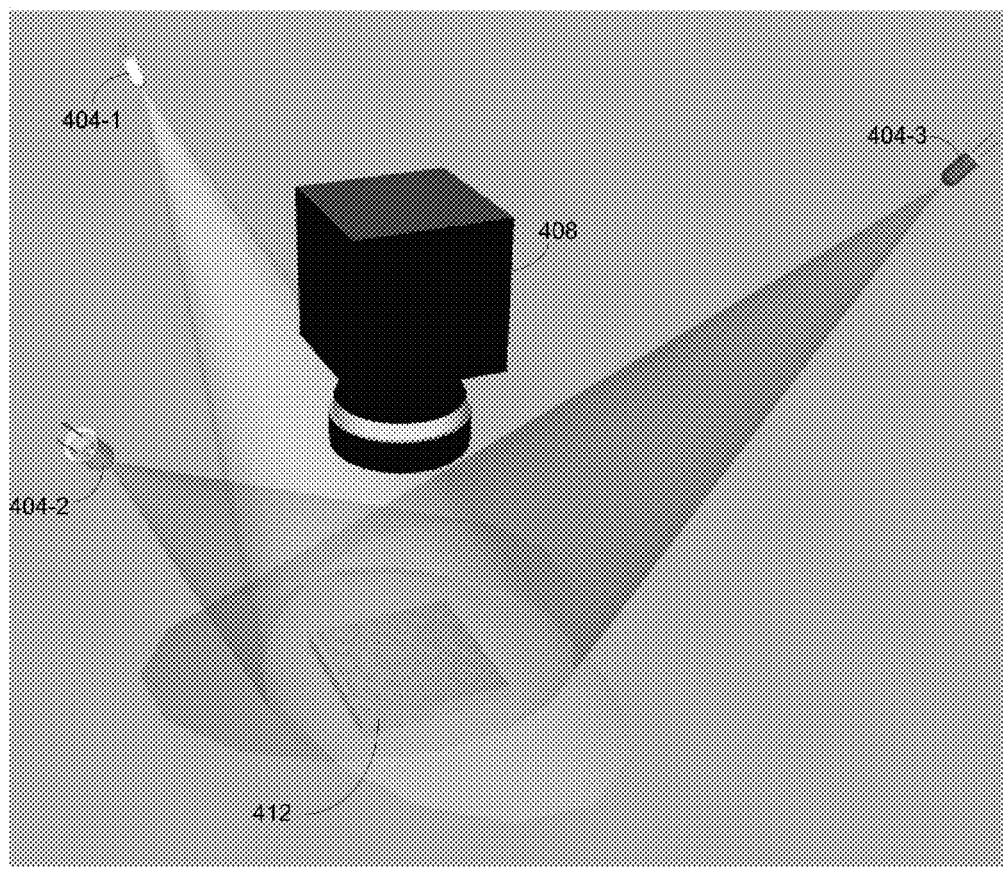
FIG. 4 illustrates the use of nominally monochromatic illuminators in different illumination geometries (COLOR)

In some embodiments, two or more illumination sources may be used that are different from each other and that affect the two or more color channels of the imager differently. This is illustrated in FIG. 4, which is generally similar to FIG. 2, having three illuminators 404 and an imager 408 used to illuminate and image a machine-readable symbol 412, but is produced separately to emphasize the different illumination characteristics. For example, the illuminators 404 in this embodiment may comprise broadband light, such as white light or broad-spectrum colored light. Broadband illumination may be generated by, for example, using a white-light LED or an incandescent source of some kind. The broadband source(s) may be filtered in some way using optical bandpass filters, shortpass filters, longpass filters, and the like. In this way, two broadband illuminators with measurably different illumination spectra may be used to illuminate the machine-readable symbol 412 under two different illumination geometries. The symbol 412 so illuminated may then be imaged by a color imager 408, resulting in an optically multiplexed image.

In another embodiment, the illumination spectra may comprise a plurality of discrete illumination wavelengths. For example, each illuminator might comprise a red-green-blue triplet. The electrical current supplied to each of the LED's in the triplet may then be adjusted to achieve different relative intensities of red, green, and blue light such that the mixture appears to have different colors in according with the known principles of color addition. In accordance with the invention, each of the illuminators corresponding to a different illumination geometry may be set to a measurably different apparent color by supplying different electrical currents to each of the red, green, and blue LEDs in the triplet. In this case, even though each of the illuminators comprises the same three wavelengths, by changing the ratio of the wavelength intensities, each triplet can affect the channels of the color imager differently.

Figure 5:
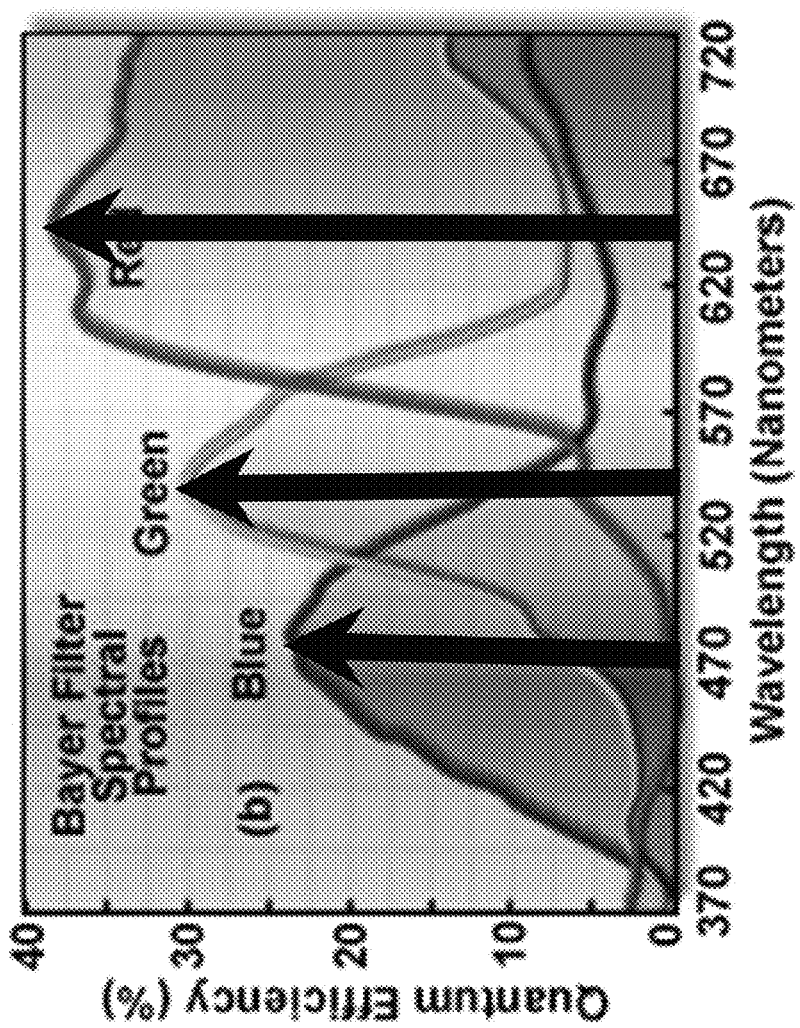
FIG. 5 shows the structure of a typical Bayer color-filter array with overlapping passbands (COLOR)
Figure 5:
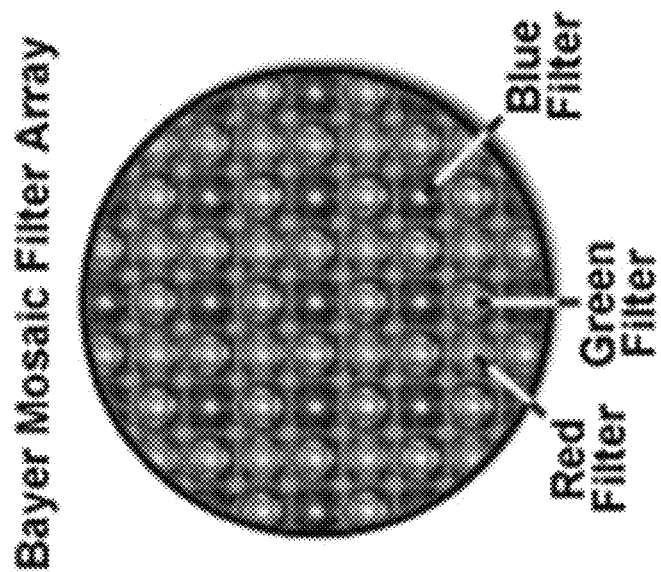

In a further embodiment, each of the illuminators corresponding to different illumination geometries may be nominally monochromatic and distinct as illustrated generally by FIG. 2. It is known in the art that the passbands of red, green, and blue elements of a typical Bayer color filter array are broad and overlapping as illustrated in FIG. 5. In the case where red, green, and blue LEDs are used for illumination, as indicated by the black arrows in the graph in the right panel of the drawing, it can be seen that each of the monochromatic LEDs will significantly affect two or more color channels. In this particular illustration, for instance, the blue LED will affect the blue and green color channels; the green LED will affect all three color channels; and the red LED will affect all three color channels. In accordance with the present invention, all three LEDs may be used since they each affect the three color channels differently. This is in contrast to suggestions in the prior art that it is desirable to omit green LEDs to avoid any spectral overlap, and to limit the illumination to using only blue and red LEDs.

Advantageously, and in accordance with the invention, the wavelength of a monochromatic LED or other source does not need to correspond to the peak wavelength of a particular color channel. The LEDs for optical multiplexing may be chosen according to such other convenient criteria as availability, pricing, brightness, and other considerations, provided only that the chosen wavelengths affect the multiple color channels in measurably different ways than the other selected LEDs.

b. Handheld Imagers

The devices described above for acquisition of images of machine-readable symbols are generally provided as fixed devices, with different imaging conditions being effected through the use of fixed illuminators and imagers such that variations in illumination angles, imaging angles, and the like may be realized through appropriate use of the fixed illuminators and imagers. In other embodiments, symbol-acquisition devices may instead be provided as nonfixed devices, which may be embodied in the form of a variety of handheld devices that include imaging capabilities. For example, modern mobile telephones and tablet computers include cameras that may be used as imagers, and processing may be effected in accordance with the description below by including appropriate applications on the handheld device.

Figure 6A:
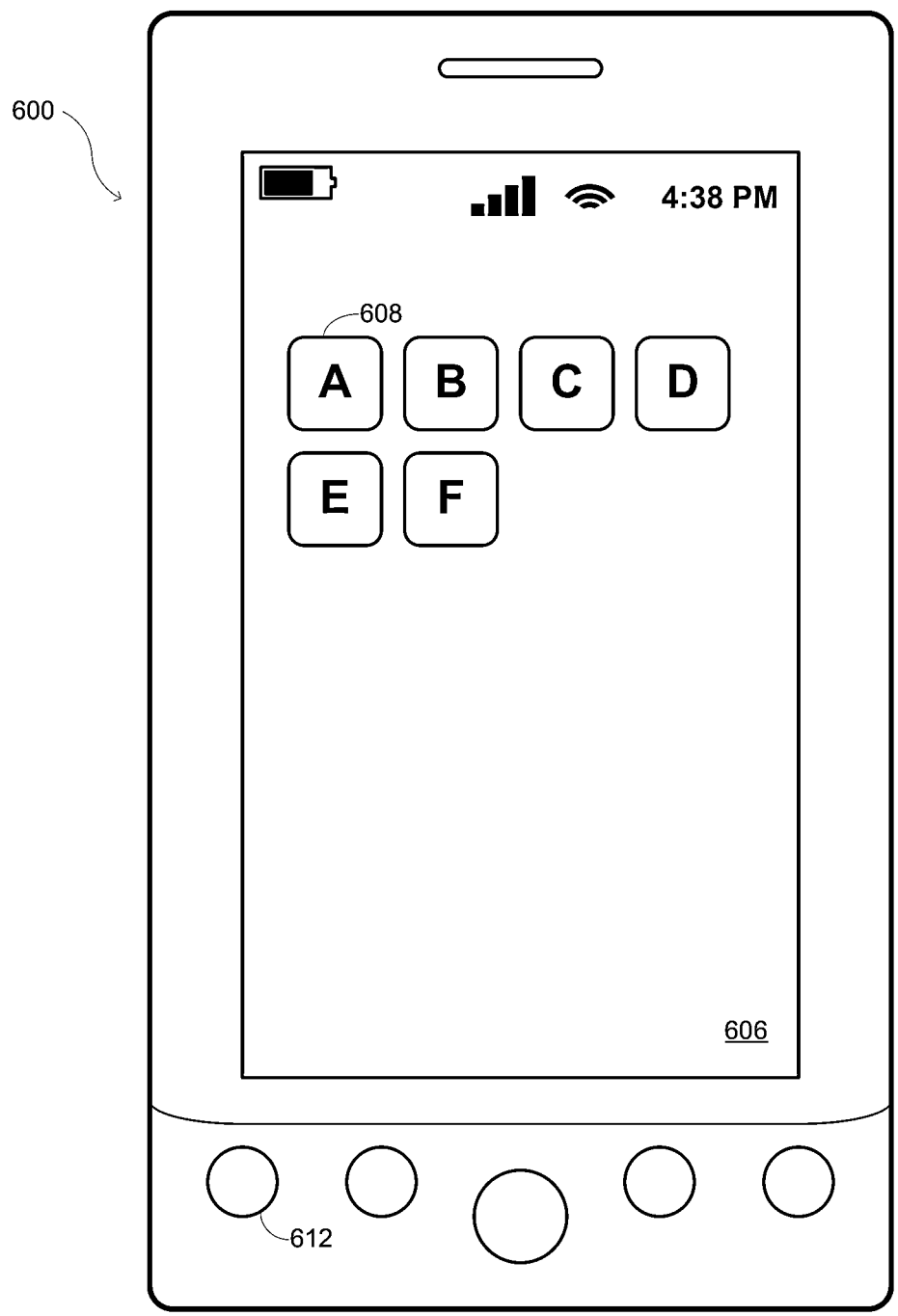
FIG. 6A is a schematic illustration of one example of a mobile communications device with the invention may be embodied.
Figure 6B:
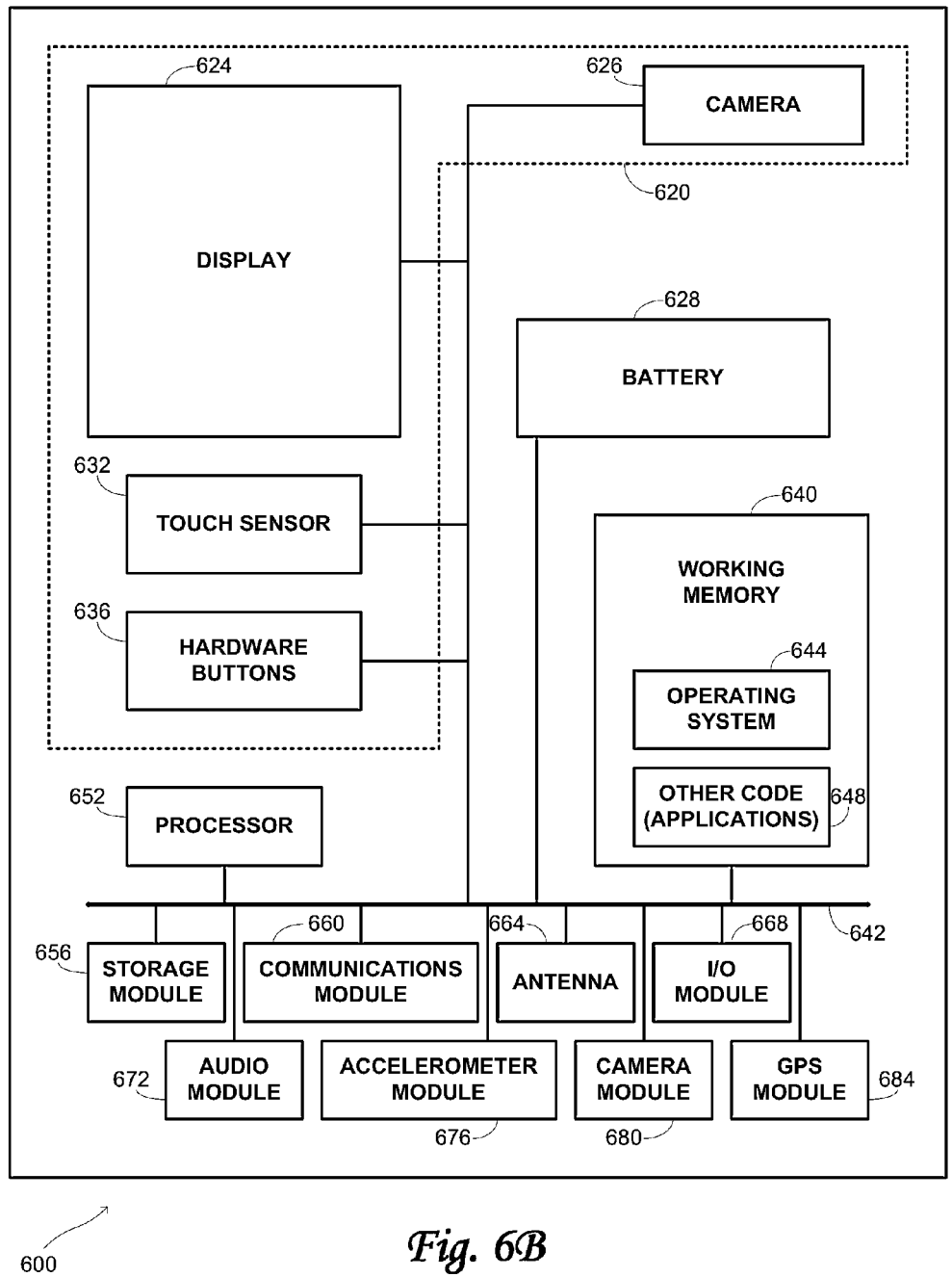
FIG. 6B is a schematic illustration of an internal structure of a mobile communications device with which the invention may be embodied.

For purposes of illustration, FIGS. 6A and 6B provide structural and functional schematic views of a typical mobile device 600, with which users may interact through a touchscreen 606 from which a number of applications 608 may be accessed, as well as through other buttons 612 provided on the device. According to embodiments of the invention, one of the applications 608 may be configured for acquisition of a machine-readable symbol.

The functional illustration of FIG. 6B is also intended to be exemplary. While the illustration identifies a number of specific functional components, it is to be understood that alternative devices may lack some of these specific components and may sometimes include other components not specifically described. The illustration of FIG. 6B includes a battery 628 coupled with other components of the device 600 through a bus 642, with those components that enable interaction between the device 600 and a user identified collectively with reference number 620 and include one or more displays 624, one or more touch sensors 632, hardware buttons 636, and a camera 626.

The camera 626 may be operated by a camera module 180 provided in addition to other modules used in providing other functionality for the device, including an audio module 672, a GPS module 684, an accelerometer module 676, an input/output module 668, an antenna 664, and a communications module 660. The structure of these modules and their interaction with the system is drawn intentionally to be reminiscent of the structure shown in FIG. 1, with software elements being located within working memory 640, including the device's operating system 644 and other code 648 to operate the different modules and to implement methods of the invention. The various modules and software may have their operation coordinated by a processor 652 that interacts with a storage module 656. The processor 652 may be embodied as one or more application-specific integrated circuits ("ASICs"), one or more field-programmable gate arrays ("FGPAs"), or one or more general-purpose processors operative to execute machine-readable instructions in the form of code. Moreover, the processor 652 may include processing acceleration in the form of a digital-signal processor ("DSP") or special-purpose processor.

Figure 6C:
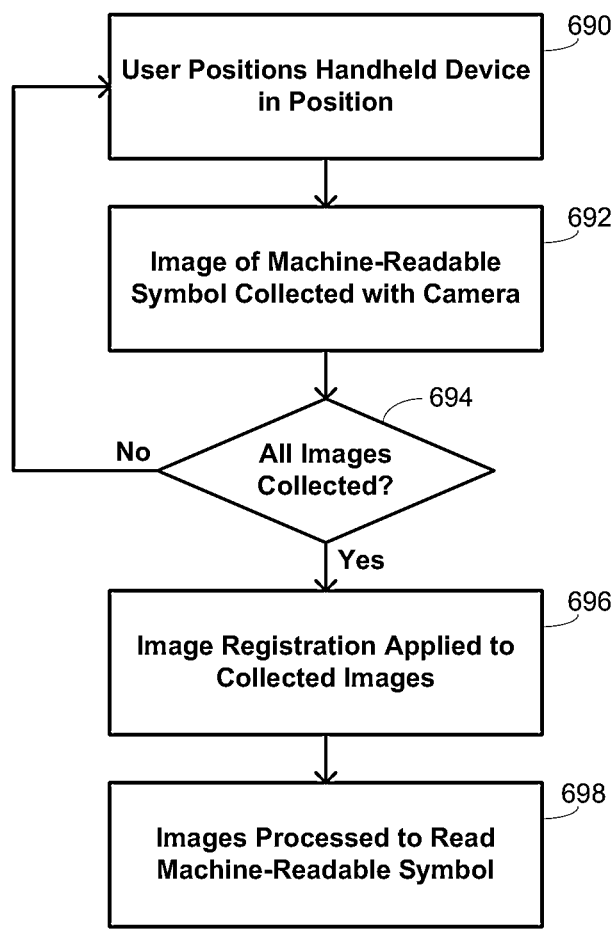
FIG. 6C is a flow diagram summarizing methods of using a mobile communications device to acquire an image of a machine-readable symbol.

The handheld device 600 of FIGS. 6A and 6B may be used to acquire images of machine-readable symbols using the method outlined by the flow diagram of FIG. 6C. At block 690, the user positions the handheld device in a first location so that the camera may be used at block 692 to collect an image of the machine-readable symbol at block 692. This is repeated for multiple positions of the handheld device 600, as indicated by the loop associated with block 694. While this provides a ready methodology for acquisition of images from different imaging orientations, it is noted that the device 600 may also be used to provide different illumination orientations and may in some instances be used to provide different spectral qualities of illumination by using the device's screen 606 as a source of illumination. Good spectral control may be achieved with devices that having appropriate illumination sources as part of the screen 606, with devices that make use of LEDs for illumination being capable of providing substantially monochromatic illumination, polychromatic illumination, diffuse illumination, and other forms of illumination such as may be used in the various processing methodologies described below. Certain embodiments that make use of a handheld device 600 also make use of an ability of the camera 626 to vary its focus so that images collected at block 692 include images with different focuses, and hence different magnifications.

It is generally expected that the level of control over the precision of the illumination and/or imaging conditions is less with a handheld device of FIGS. 6A and 6B than with a fixed device of FIGS. 1-4, but compensations may be made through image registration at block 696. A variety of techniques are known in the art for registration through transformation of different data sets onto a common coordinate system, thereby compensating for user imprecision in using the handheld device 600. Both intensity-based and feature-based image-registration methods may be used in different embodiments. Various transformation models may also be used for to effect registration, including linear transformations that apply linear transformations of translation, rotation, scaling, and other affine transformations. In some embodiments, elastic transformations may also be applied for local warping of the image, including the use of radial basis functions and large deformation models.

Once the collected images have been registered, they may be combined or processed as described elsewhere herein to read the machine-readable symbol at block 698.

b. Artifacts

In some circumstances, the machine-readable symbol may be present on a surface that potentially gives rise to certain imaging artifacts. For example, a printed barcode may be produced on a glossy substrate such as a plastic of some kind. Alternatively, the symbol may comprise a direct-part mark made in glass, metal, or some other glossy material using peening, cutting, casting, chemical etching, laser etching, or another of such methods.

Figure 7A:
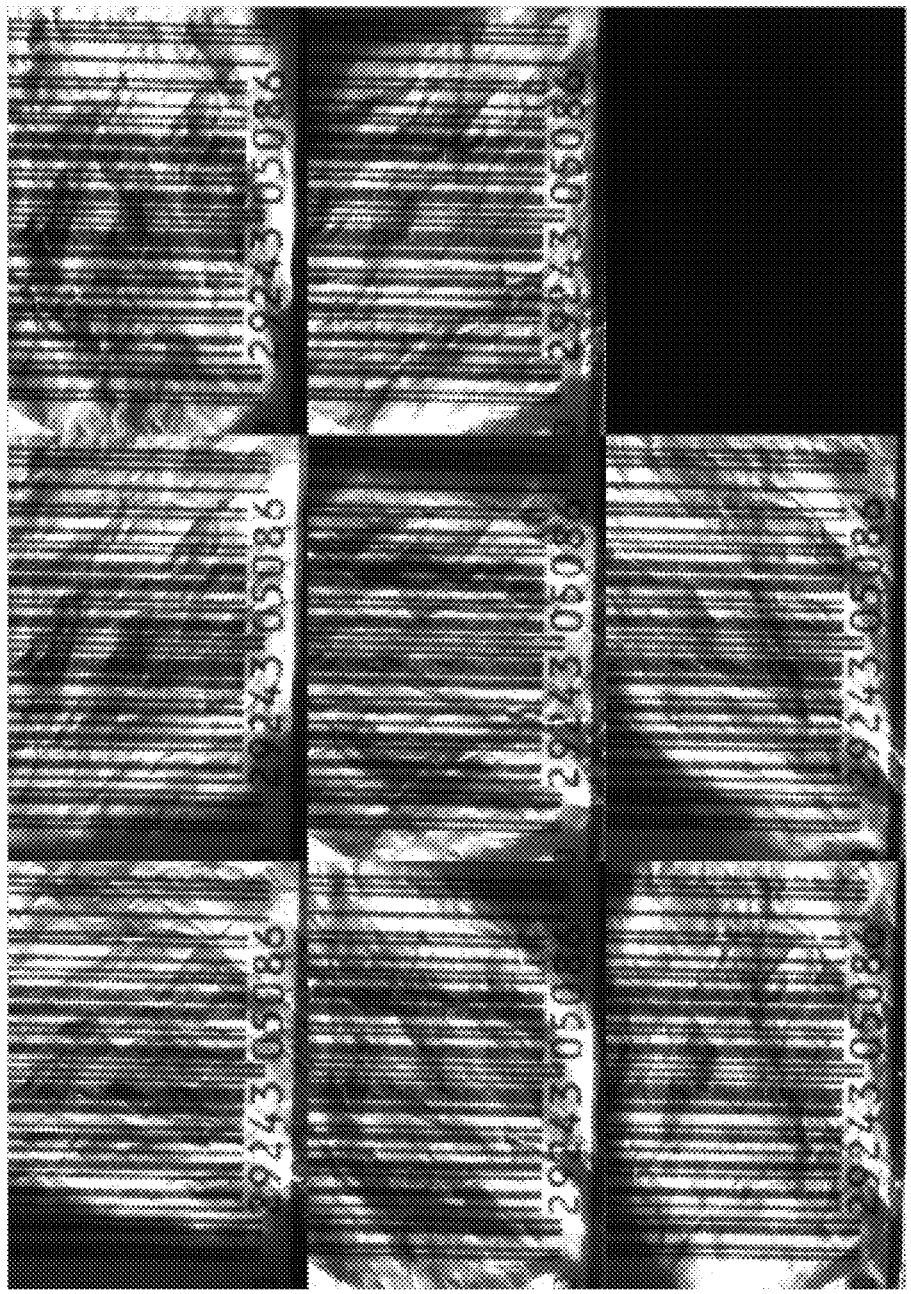
FIG. 7A shows a barcode imaged by using illumination at eight different azimuthal angles.

In these cases, images of the symbol may be obscured in whole or in part by glints, specular reflections, poorly illuminated regions, and other illumination and/or imaging artifacts. In particular, illumination variation of the symbol may cause the image of the symbol to be obscured in whole or in part. Principles for this aspect of the invention are illustrated for a one-dimensional barcode in connection with FIGS. 7-12, but it will be appreciated that the same principles operate with other types of machine-readable symbols, including two-dimensional and color barcodes, as well as direct-part marks and others. FIG. 7A shows eight images of a one-dimensional barcode collected with illumination light at eight different azimuth angles and imaged by a stationary imager. In this case, the illumination was at an elevation of approximately 75° (measured from the optical axis of the imager) and azimuth angles of 0°, 45°, 90°, 135°, 180°, 225°, 270°, and 315°. The imager was a CMOS imager and the light sources were LEDs with a central wavelength of 400 nm. As can be seen from the drawing, the regions of bright and dark intensities due to the surface topography change according to the illumination orientation.

A set of such images may be processed in various ways according to embodiments of the invention to reduce or eliminate such illumination variations. For example, a pixelwise sort of the eight images was applied, the operation resulting in the eight new images shown in FIG. 7B, with the images redisplayed as images from low sort values (upper left) to high sort values (third row, second column). In this way, a more consistent, higher-contrast single image is generated by combining the information from the eight raw images. While eight illumination sources were used in this example, there is no restriction on the number of illumination sources that may be used in different embodiments.

Figure 8:
FIG. 8 demonstrates the effect of applying balanced acquisition to barcode images.

It is noted that the upper-left image of FIG. 8 corresponds to the pixelwise minimum across the eight raw images as is sometimes done in the prior art. This minimum-pixel-value barcode is unable to be properly read by a commercial online decoder. In contrast, some of the other sorted images are capable of being properly read and decoded, specifically the sixth, seventh, and eighth highest values, which correspond to the second row, third column image and the two images in the third row.

This sorting operation is merely an example of a more general set of processing transformations applied according to embodiments of the invention. For instance, in another example, a bilateral filter is applied to one or more of the images (or to a composite of the images) using edge information generated by a different method, such as a median of gradients. In some cases, it is advantageous to combine all of the images in some way. Methods for doing so may include generating one or more factors from eigenanalysis, independent component analysis, tensor analysis, and the like, or other such operations performed on the raw images or some derivative of the raw images.

Figure 9:
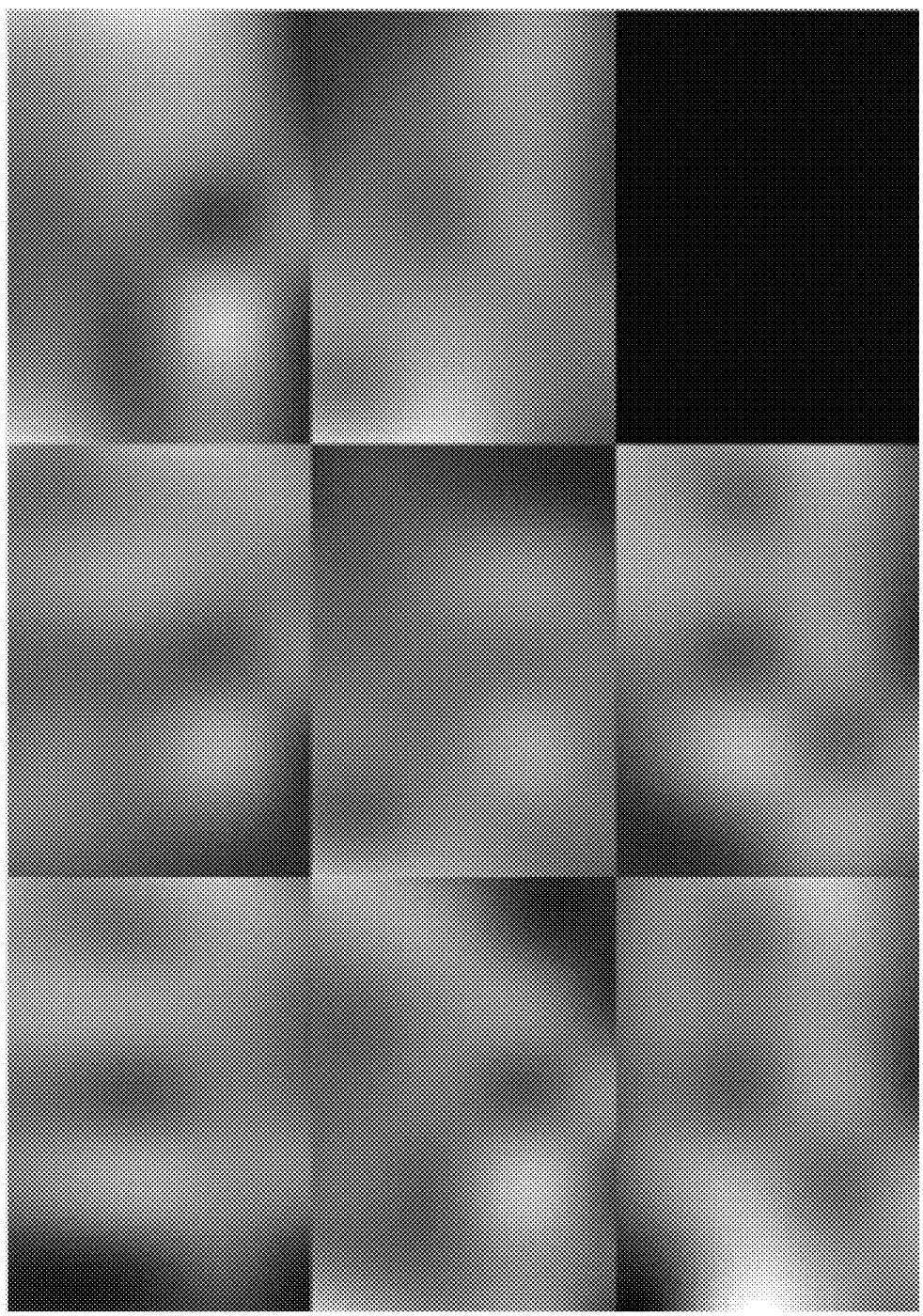
FIG. 9 shows estimated illumination profiles for the images of FIG. 7A, generated using a wavelet smoothing function applied to the images in FIG. 7A.

In some instances, a simple averaging operation is sufficient to combine the raw images and reduce the image artifacts to acceptable levels. In particular, in cases where there are a relatively large number of raw images taken under different illumination conditions and/or the illumination conditions are approximately balanced, averaging may be effected. "Balanced" illumination refers to a set of illumination conditions in which the illumination portions of the image vary between illumination conditions in complementary fashion. For example, in cases where illumination is symmetric in the azimuth angle, i.e. with 180° symmetry, the resulting images display complementary artifacts that may be reduced through averaging. FIG. 9 shows an example of the benefits of averaging with a balanced system. In this drawing, the left image is the result of averaging the eight images shown in FIG. 7B. The system is balanced, with light sources at equal elevations (approximately 75°) and separated by an azimuth angle of 45° in a full circle around the object. In order to demonstrate the benefits of a balanced illumination system, the middle image shows the result of averaging only four of the raw images: numbers 1, 3, 5, and 7, which are spaced uniformly at 90° and span azimuth angles of 0-360°. In contrast, the rightmost image results from averaging four raw images that are unbalanced: numbers 1, 2, 3, and 4, which are separated by 45° and span azimuth angles of 0-180°. As can be seen from the drawing, the result of unbalanced averaging retains more illumination artifacts than the average of an equal number of images generated from a balanced illumination system.

In some cases, the raw images may be uniformly weighted when combined through averaging or other operations. In other cases, a nonuniform weighting may be applied to the images before the averaging or other operations. For instance, the quality of each raw image may be ascertained by a variety of criteria that include contrast, noise, barcode quality, barcode detectability, barcode readability, amount of specular reflections, illumination variability, and the like, with the resulting quality measures being used to weight the images being averaged; high-quality images may be weighted more highly than low-quality images.

In some cases, it is desirable to determine estimates of key intrinsic characteristics of the object from the raw images and to use such estimates for processing the machine-readable symbols rather than attempting to decode the raw images themselves. This is so because the machine-readable images are placed on the object by affecting one or more intrinsic object characteristics such as reflectance, absorbance (or pseudo-absorbance or reflectance), texture, surface profile, color, chromaticity, and other such parameters. But the raw images are the result of interactions of the object and symbol with the illumination system as well as the imaging system. The raw images contain a representation of the interaction of all these different effects, only some of which are intrinsic to the object or symbol. In some cases, it is beneficial to attempt to separate the raw images into intrinsic and extrinsic effects, and then use the derived intrinsic characteristic(s) of the object and symbol for subsequent processing and decoding. One example of this approach is illustrated by processing the raw images using various photometric stereo methods to derive measures of surface topography as well as albedo or reflectance. This approach is discussed further below.

Figure 7B:
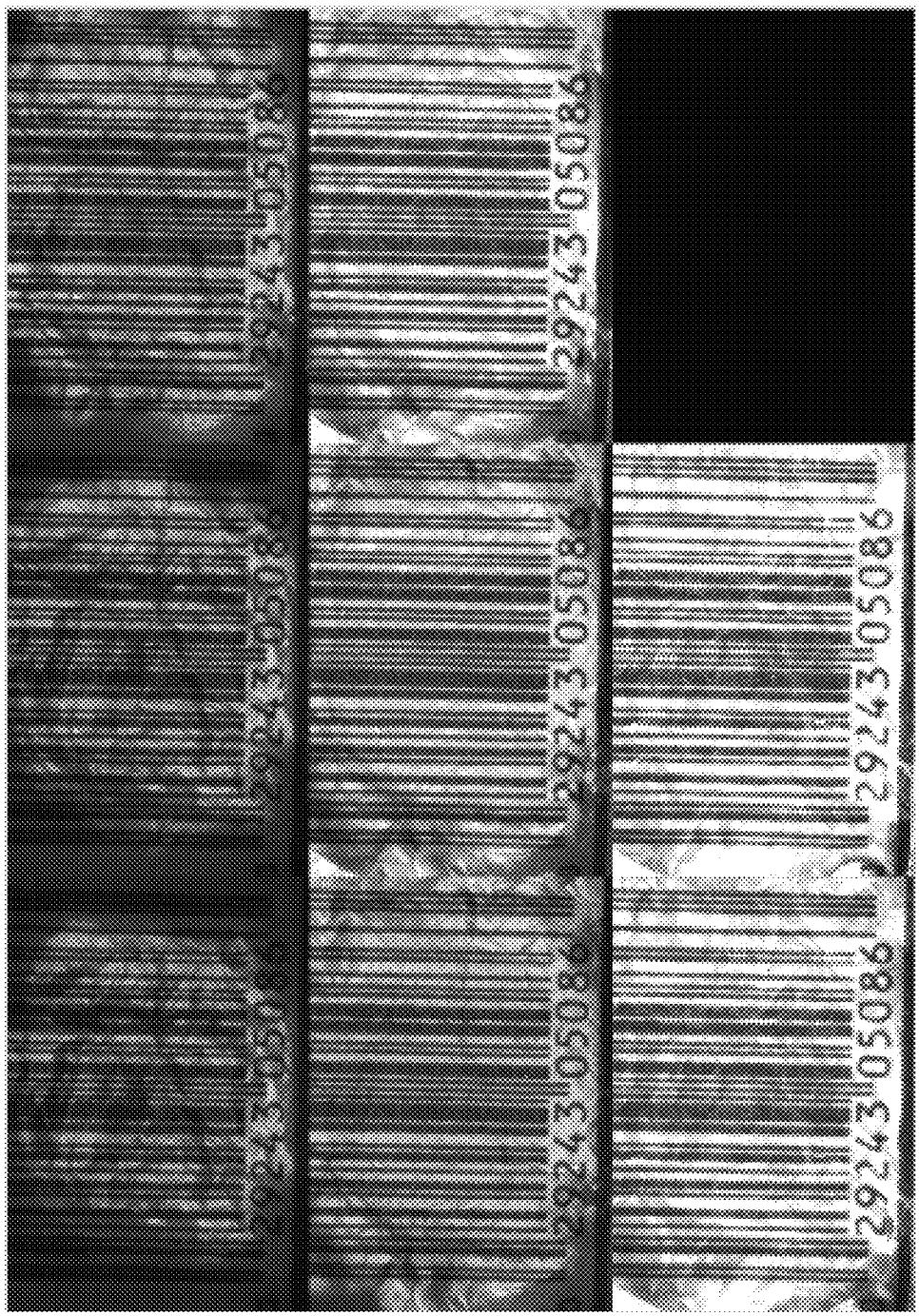
FIG. 7B shows images generated from the images of FIG. 7A after undergoing pixelwise sorting and redisplay.

Another example of an intrinsic object characteristic that may be estimated from the raw images is the reflectance or log (reflectance) (also referred to as the pseudo-absorbance) of the objects. In order to estimate the reflectance, the illumination characteristics for each raw image should be estimated. If constant or otherwise applicable, such characteristics of the illumination system and/or the imaging system may be calibrated separately and then applied to the raw images. One method for estimating the illumination characteristics from the raw images is provided by smoothing the raw images, assuming that the illumination variation is of lower spatial frequency than the symbol and/or other characteristics of the object or imaging system. A smoothing such as a wavelet smoothing or another type of smoothing known in the art may be applied. An example of the results of this operation when a wavelet smoothing is applied to the data of FIG. 7B is shown in FIG. 9.

Figure 10:
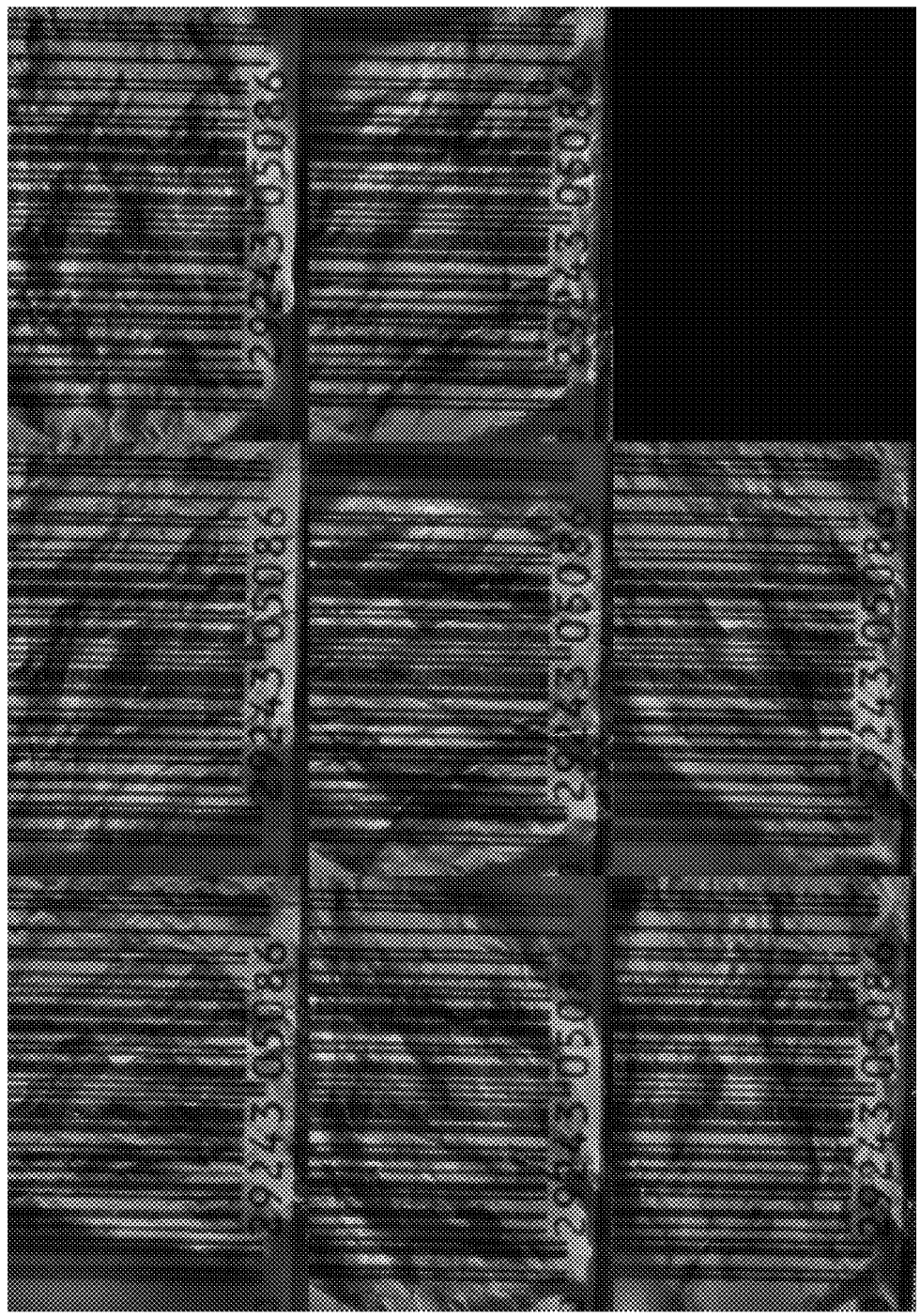
FIG. 10 shows reflectance images generated from raw images in FIG. 7A and the estimated illumination profiles of FIG. 9.

The estimated illumination profiles in FIG. 9 may be used as denominator for estimating the object reflectance as $$R(x, y) = \frac{I(x, y)}{S(x, y) + N},$$

where $R(x,y)$ is the object reflectance, $I(x,y)$ is the raw image, $S(x,y)$ is the estimate of the illumination and imaging variations under certain conditions, and $N$ is a regularization term to avoid numerical instability due to noise, etc. By using FIG. 9 in combination with FIG. 7A in this manner, an estimate of reflectance may be found as shown in FIG. 10. The corresponding absorbance (or pseudo-absorbance or log-reflectance) images are shown in FIG. 11.

Figure 11:
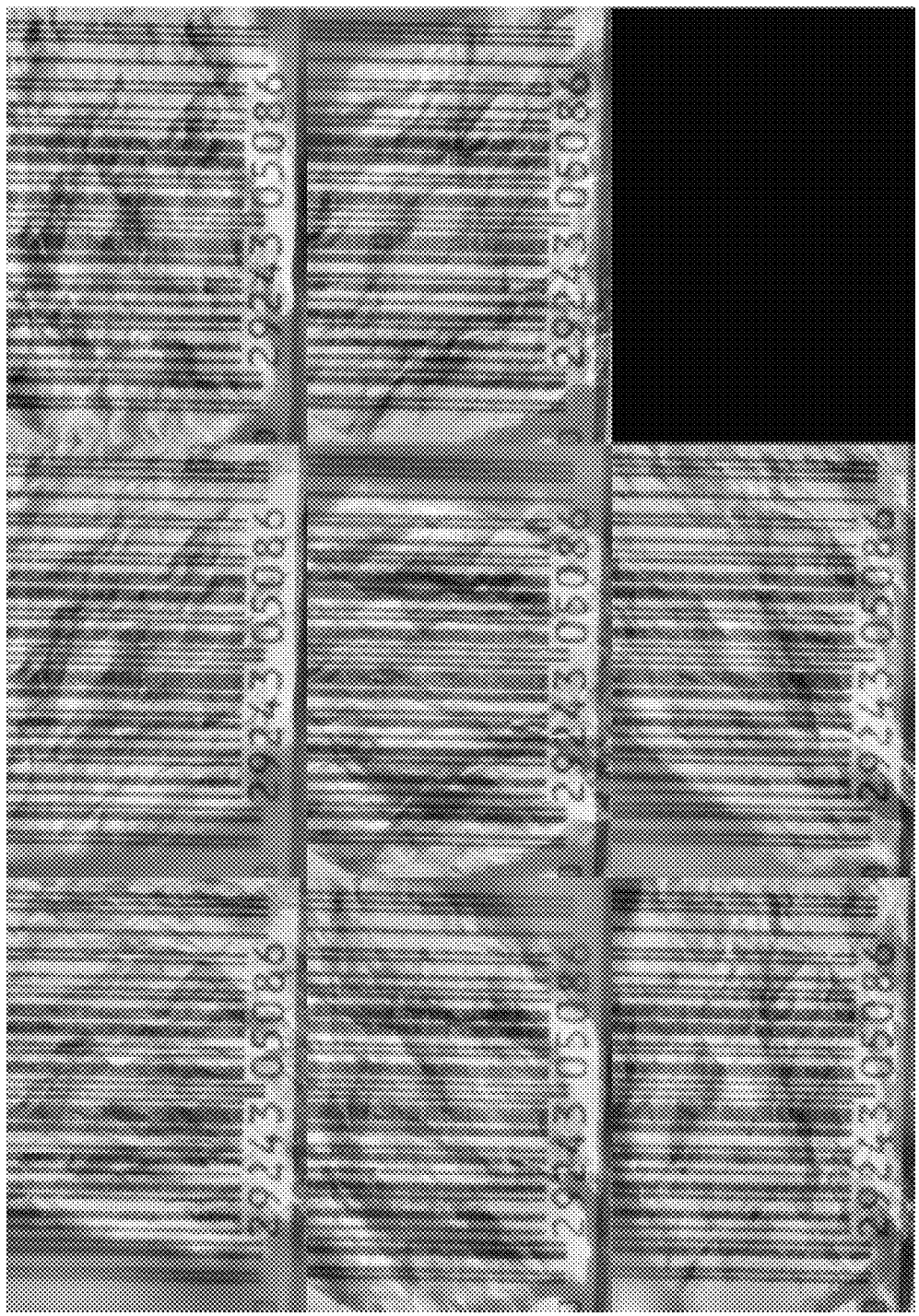
FIG. 11 shows log (reflectance) or pseudo-absorbance generated from the images shown in FIG. 10.
Figure 12:
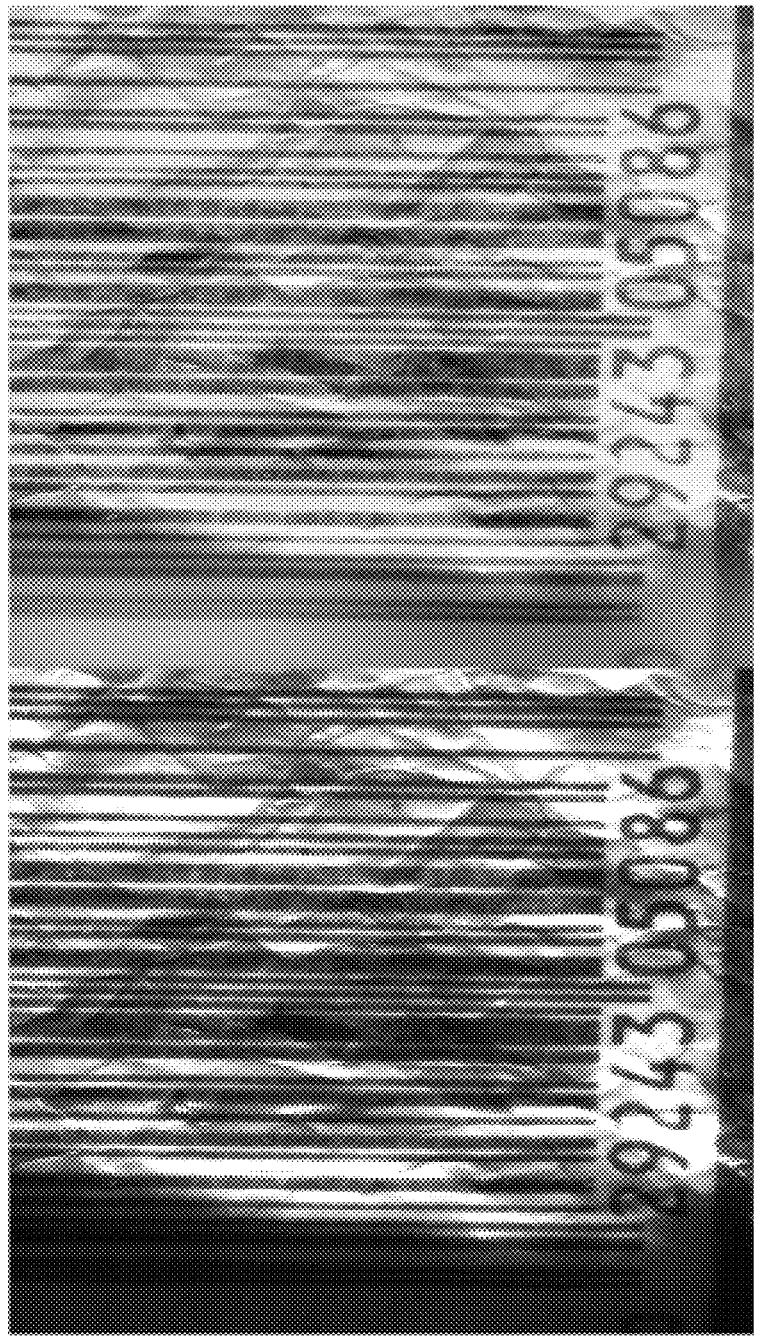
FIG. 12 shows rescaled raw-intensity and pseudo-absorbance images for the upper left images in FIGS. 5 and 11.

While the pseudo-absorbance images shown in FIG. 11 are not artifact-free, they are more uniform than the corresponding raw-intensity images of FIG. 7A. Moreover, some of the barcode features that were in the poorly illuminated regions of the images are expressed with higher contrast in the pseudo-absorbance images of FIG. 11. The first (upper left) image for the raw-intensity data in FIG. 7A is compared directly with the pseudo-absorbance data in FIG. 11 for easy comparison in FIG. 12.

In some cases, the stack of images may be processed by methods such as photometric stereo. Such a technique allows the separate estimation of the reflectance (albedo) and the surface topography. Once the surface topography is known, it may be used to evaluate points of specularity and correct for them in a variety of ways. The surface topography may also be used to correct for the nonplanarity of the symbol in those cases where it is a nominally planar symbol, such as in the case of a printed barcode. Alternatively, if the symbol is a direct-part mark machined or etched into the substrate, the surface topography may be a better representation of the symbol than any of the raw images or the derived composite reflectance image.

In embodiments where the illumination comprises white-light or other broadband illumination, the chromatic characteristics of the object (symbol and background) may provide a relevant source of information about the symbol pattern and/or interfering specularities. For example, specularities have a chromatic content that is closer to that of the illumination source rather than those of the object being illuminated. As such, the chromaticity of the raw images may be analyzed to determine those pixels or groups of pixels with chromatic content that is close to that of the light source. Those pixels may be excluded or down-weighted when the plurality of raw images are combined in some way to produce a composite symbol image.

c. Chromatic Multiplexing

In some embodiments, it is desirable to have light sources with different characteristics illuminate a machine-readable symbol. Such characteristics may include wavelength, polarization, azimuth angle, elevation angle, directional versus diffuse illumination, and the like. In some cases, multiple images of a machine-readable symbol may be collected by a single imager under multiple illumination conditions by collecting a sequence of images: for example, one of a plurality of sources could be illuminated, an image acquired, the source extinguished and a second source illuminated, a second image acquired, and so on.

In other cases, images are collected for multiple illumination conditions simultaneously. In particular, embodiments of the invention allow for acquisition of machine-readable-symbol images from multiple illumination geometries simultaneously. For example, a symbol might be illuminated with red light oriented at a certain azimuth and elevation angle; with green light oriented orthogonally to the red light in the azimuth direction and either the same or different elevation angle; and with blue light that diffusely illuminates the object, with all such illuminators turned on simultaneously. Such a configuration may then be imaged by a color imager that comprises a Bayer imager with red, green, and blue pixels arranged as a color filter array. The resulting raw image may then be separated into three images corresponding to each of the red, green, and blue color channels. Each of these channels corresponds to a different illumination geometry as well as to a different wavelength. The simultaneous measurement of different illumination conditions is referred to herein as "chromatic multiplexing." The three resulting images may be analyzed separately or combined in some way to extract an image of the machine-readable symbol that may then be processed further.

Similar chromatic multiplexing may be performed using more colors or fewer colors or different colors, according to characteristics of the color imager. In one embodiment, the illumination colors substantially correspond to the passbands of the individual filter elements within the color imager. Also, each such multiple colors of illumination may alternatively or additionally differ by the orientation of polarization (or the absence thereof) relative to a polarizer present in the imaging system and/or relative to the polarization characteristics of the symbol or other components.

Figure 3:
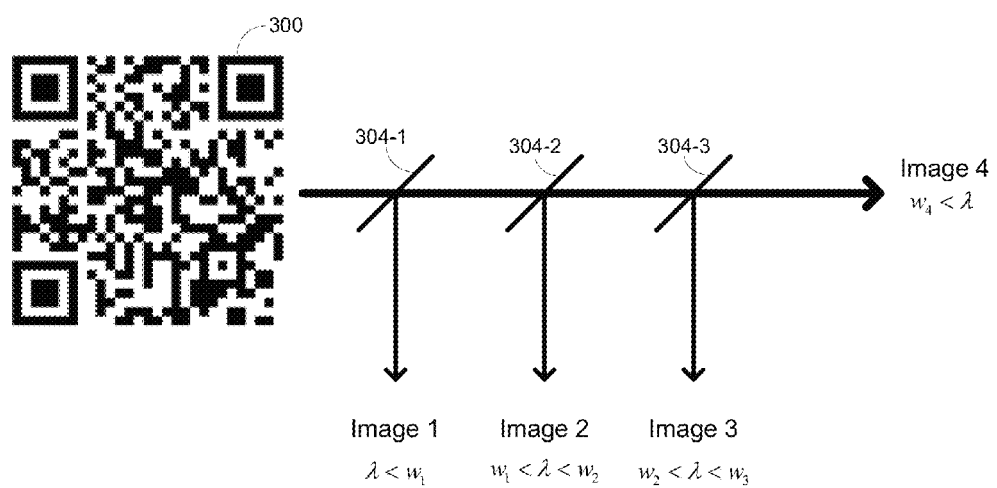
FIG. 3 illustrates the use of multiple monochromatic imagers combined with chromatic beam splitters.

Alternatively, multiple noncolor imagers may be used in conjunction with chromatic beamsplitters to accomplish a similar separation of the chromatically multiplexed images as was performed using a color imager that incorporates a color filter array. An example of this configuration is shown in FIG. 3 and described elsewhere in this application. As well, other mechanisms of recording and separating different color channels may be used.

3. Symbol Types a. Dual-Mode Machine-Readable Symbols

Certain embodiments of the invention make use of multiple aspects of conventional machine-readable symbols to produce a dual-mode or multi-mode symbol. In one exemplary embodiment, a dual-mode symbol is fabricated by using both the reflectance and topography to instantiate separate patterns. One pattern may be printed on a surface, which is referred to herein as a "reflectance barcode" and a different pattern may be incorporated in the surface topography before, during, or after the reflectance barcode, in substantially the same or overlapping location as the reflectance barcode. This second pattern is referred to herein as a "topographic barcode." The result is a composite of two different patterns manifested using two different characteristics of an object.

Figure 13:
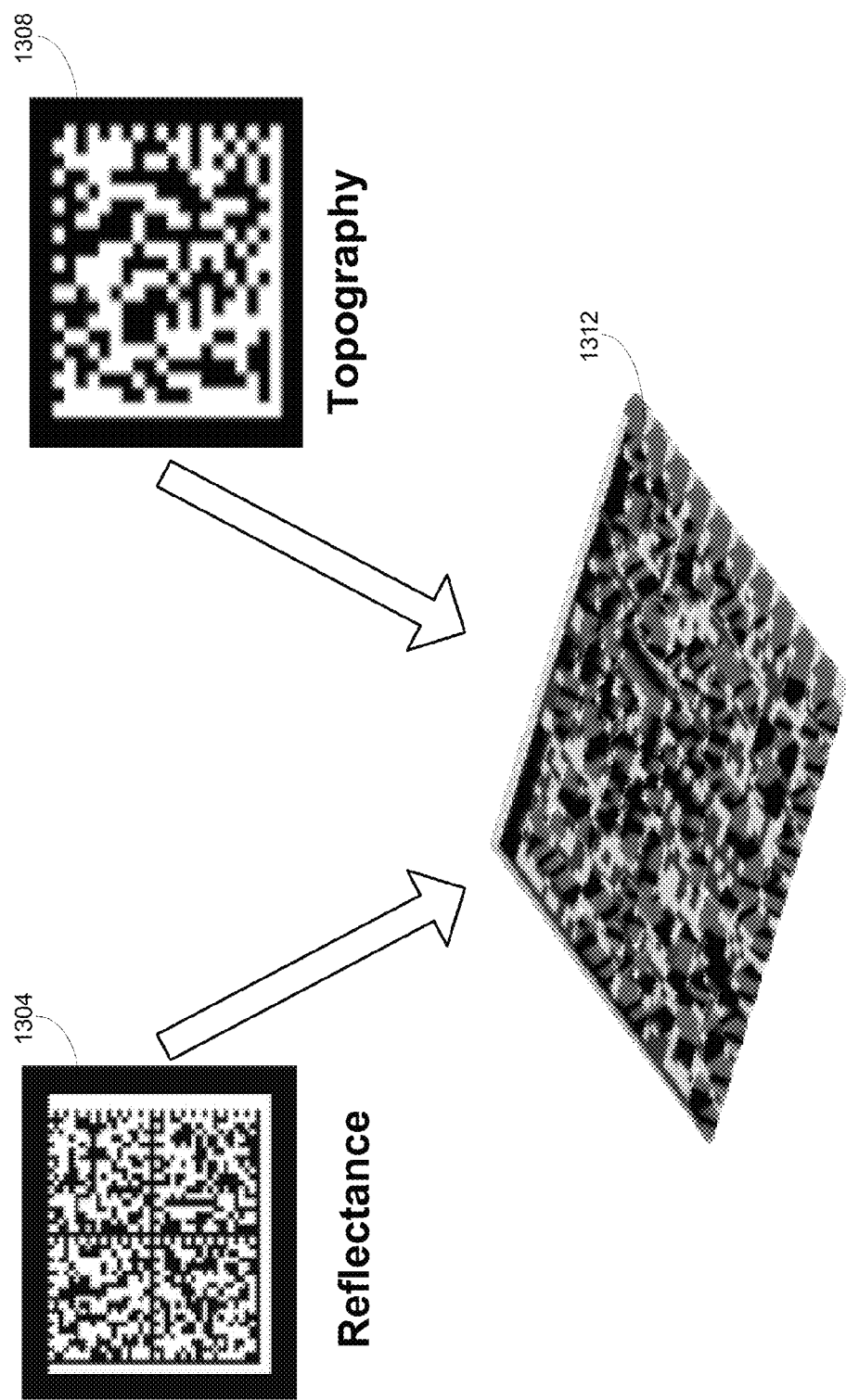
FIG. 13 provides an illustration of components of a dual-mode barcode.

This is illustrated in FIG. 13 where the reflectance barcode 1304 is printed on a thin, conformal membrane and the topographic barcode 1308 is produced by machining, laser-etching, or similar technique into a substrate that may be made of metal, plastic, or some other material. The conformal layer is applied over the substrate with the reflectance and topographic barcodes 1304 and 1308 overlapping to produce the dual-mode symbol 1312. Similar dual-mode symbols can be generated by printing a first barcode on a deformable material such as paper or sheet metal. A second barcode may then be impressed on some or all of the first barcode using embossing or stamping. In another embodiment, a topographic barcode may be machined into the substrate using standard methods. A second barcode may then be painted on the first barcode using spraying and other methods known in the art.

The resulting dual-mode symbol 1312 may, for example, be imaged using a single imager and a variety of illumination angles. Such a set of images may then be processed using photometric-stereo processing techniques to separately evaluate the reflectance and topographic characteristics that arise from the reflectance barcode 1304 and topographic barcode 1308 respectively. The separately evaluated images may then be decoded in the usual way to extract messages from each of the barcodes so formed.

Other types of multi-mode symbols also fall within the scope of the invention. For example, barcodes may be combined using properties such as polarization characteristics, spectral characteristics in the form of color, textural characteristics, and the like. In this way, two or more machine-readable symbols instantiated using different characteristics may be combined together and later separated by collecting and processing multiple different images of the symbol region.

Alternatively, different characteristics may be combined together to provide a symbology of a single barcode that is of higher order than binary. For example, by combining reflectance and depth, the symbols could be white-surface, white-deep, black-surface, black-deep, leading to a quaternary symbol set. Other combinations such as reflectance-texture, reflectance-polarization, depth-texture, depth-texture-reflectance, and so on may be combined within the scope of the invention.

b. Direct-Part Marks

As previously noted, direct-part marks may advantageously be incorporated as part of an item by modification of a surface of the item using such techniques as laser etching, chemical etching, dot peening, casting, machining, and the like. The optically multiplexed multi-imaging sensors described in connection with FIGS. 1-5 may be used for acquisition of such direct-part marks, taking advantage of the multi-imaging capabilities of the sensors.

Figure 14:
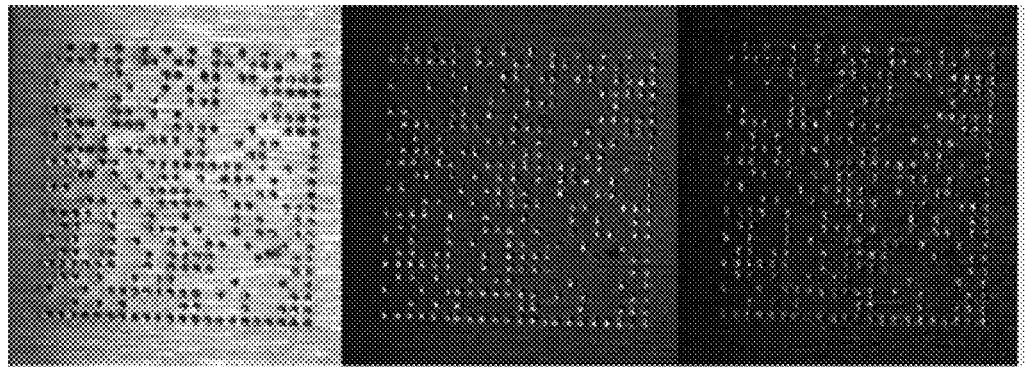
FIG. 14 shows red, green, and blue color planes from a dot-peened machine-readable symbol.
Figure 15:
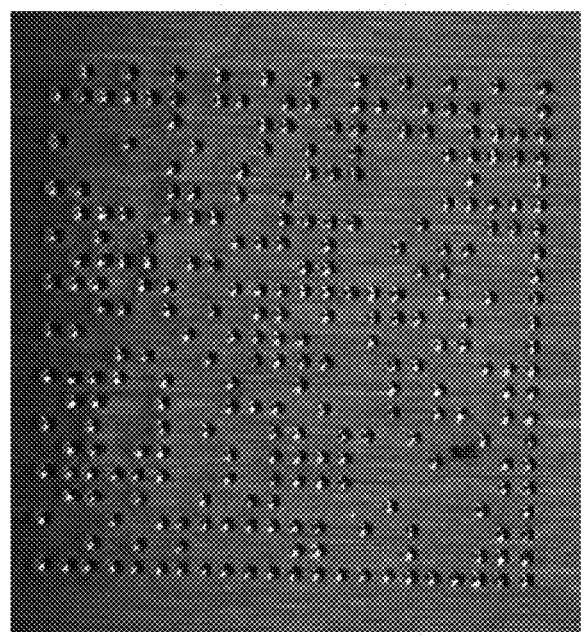
FIG. 15 is a color image generated from the three raw color planes shown in FIG. 14.

Such a sensor was used by the inventors to collect images from a variety of different data-matrix direct-part marks. One example of a set of red, green, and blue images collected in such a manner is shown in FIG. 14 for a machine-readable symbol created by using a dot-peening process so that the symbol is manifested through small depressions in a metal substrate. The sensor in this illustrated used green and blue sources that were provided as directional LED's while the red source was an on-axis diffuse light source, and the imager configured to view the object coaxially to the red diffuse source via an optical beamsplitter. The left portion of the drawing shows the red color plane, the central portion of the drawing shows the green color plane, and the right portion of the drawing shows the blue color plane. As obvious from the drawing, the images of the symbol collected under direct illumination (central green and right blue) are distinctly different than the images acquired with diffuse (left red) illumination. These three images may be viewed as a single color image as shown in FIG. 15.

Figure 16:
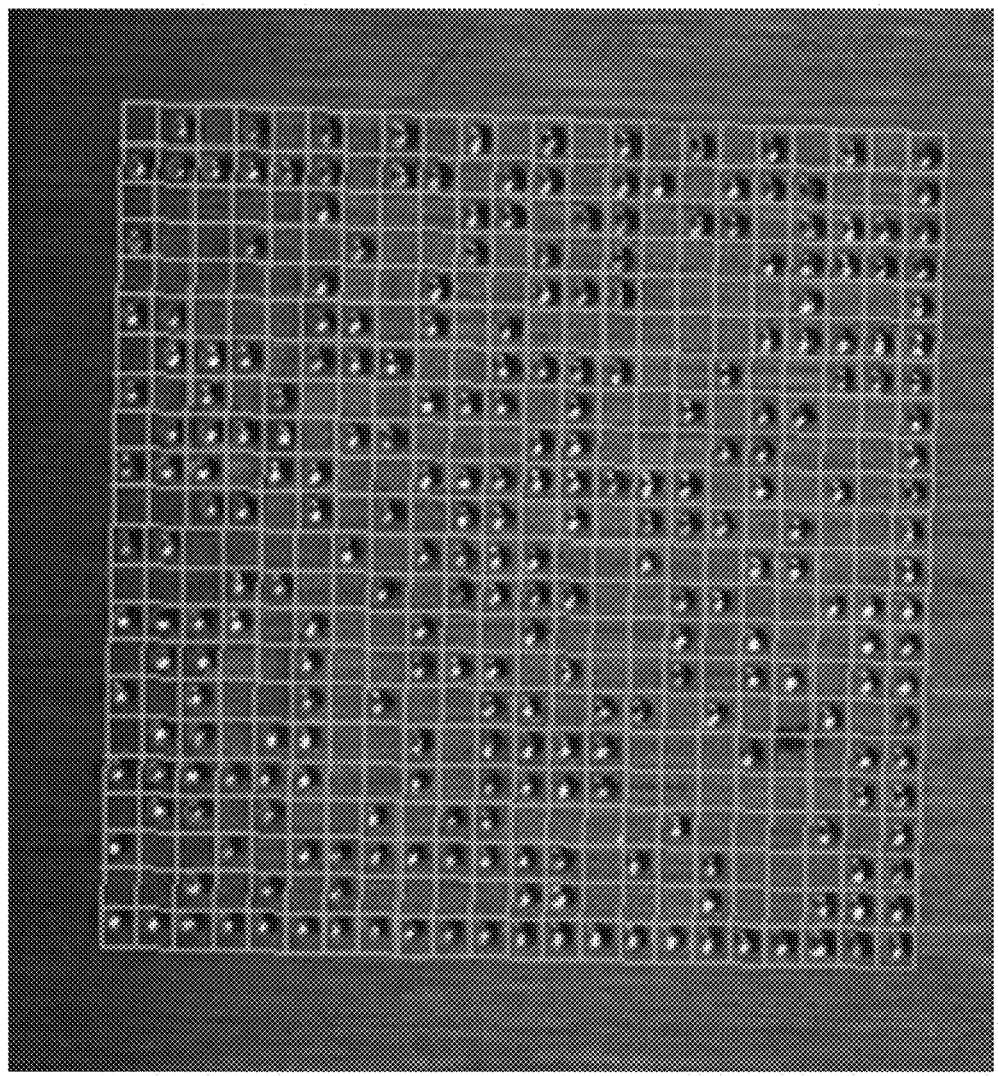
FIG. 16 shows a dot-peened machine-readable symbol with cell locations established (COLOR)

The presence, position, and orientation of this symbol may be determined using methods known in the art, and the raw images may be preprocessed before or after the detection is performed. As an example of a detection method, a DataMatrix barcode such as illustrated in FIGS. 14 and 15 is known to have two "solid" edges and two edges with alternating on/off elements. Such prior knowledge facilitates the use of image-processing techniques such as line detectors, edge detectors, corner detectors, and the like to be applied to the images to determine the boundaries of the barcode. Preprocessing of the barcode may include noise filtering, correction for nonuniform illumination, geometric correction, contrast enhancement, spatial filtering, and other processing of the sort. Once the symbol is detected and located, the boundary and the individual cells of the symbol may be determined as illustrated in FIG. 16, with lines drawn in the figure to define a grid in which individual cells are either peened or not peened.

Figure 17:
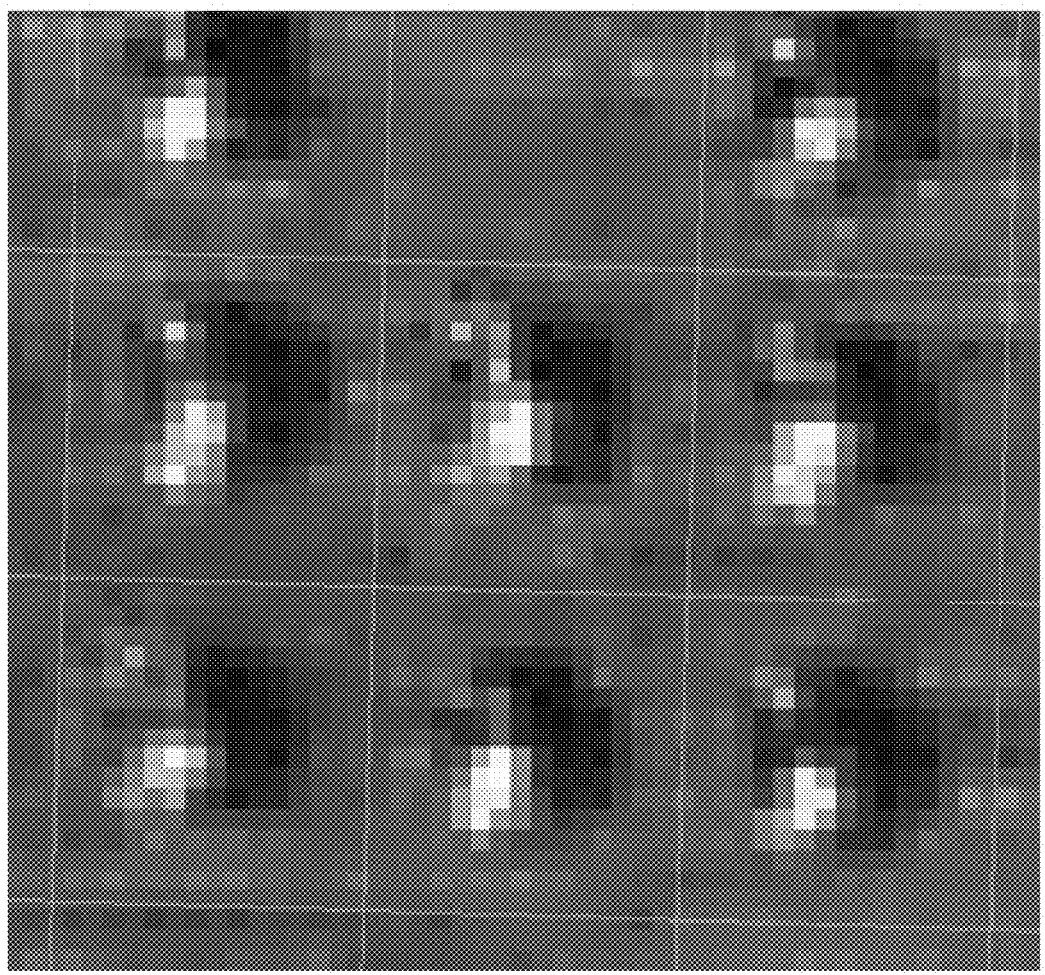
FIG. 17 is a close-up of a portion of FIG. 16 that shows that the manifestation of diffuse (red) illumination and two different direct (blue, green) illumination are all different from each other (COLOR)

A close-up of a small number of cells in FIG. 17 shows the nature of the three different images collected under the three illumination conditions. As readily observed, the red diffuse illumination causes the substrate metal to appear as bright, except in regions in which the dot-peen depression is present, which instead show up as dark circles. In contrast, the direct green and blue illumination are dark everywhere except in the depressions and in other imperfections in the metal substrate. Furthermore, the location of the bright (specular) spot due to the green illuminator is in a different location from the bright spot due to the blue illumination, as expected from the geometric considerations associated with specular reflections as described above.

Because each of the raw color images manifests the features of the symbol differently, these images are not well-suited to being directly combined through image fusion and other such techniques. Instead, embodiments of the invention directly analyze the spatio-spectral characteristics of each cell to determine to which of the binary states (peened or not peened) the cell corresponds.

Once the barcode position and orientation are determine, there are a number of reference features of the data-matrix symbol that may be used to determine examples of the "on" and "off" states of this particular symbol collected under this particular set of illumination conditions. For example, the data-matrix symbol has two solid edges that may be used for locating and orienting the symbol, two edges with alternating on-off patterns that are used to determine the number of cells, a quiet zone that surrounds the symbol with "off" cells, etc. Other direct-part symbols have similar portions that are defined by applicable standards.

Figure 18:
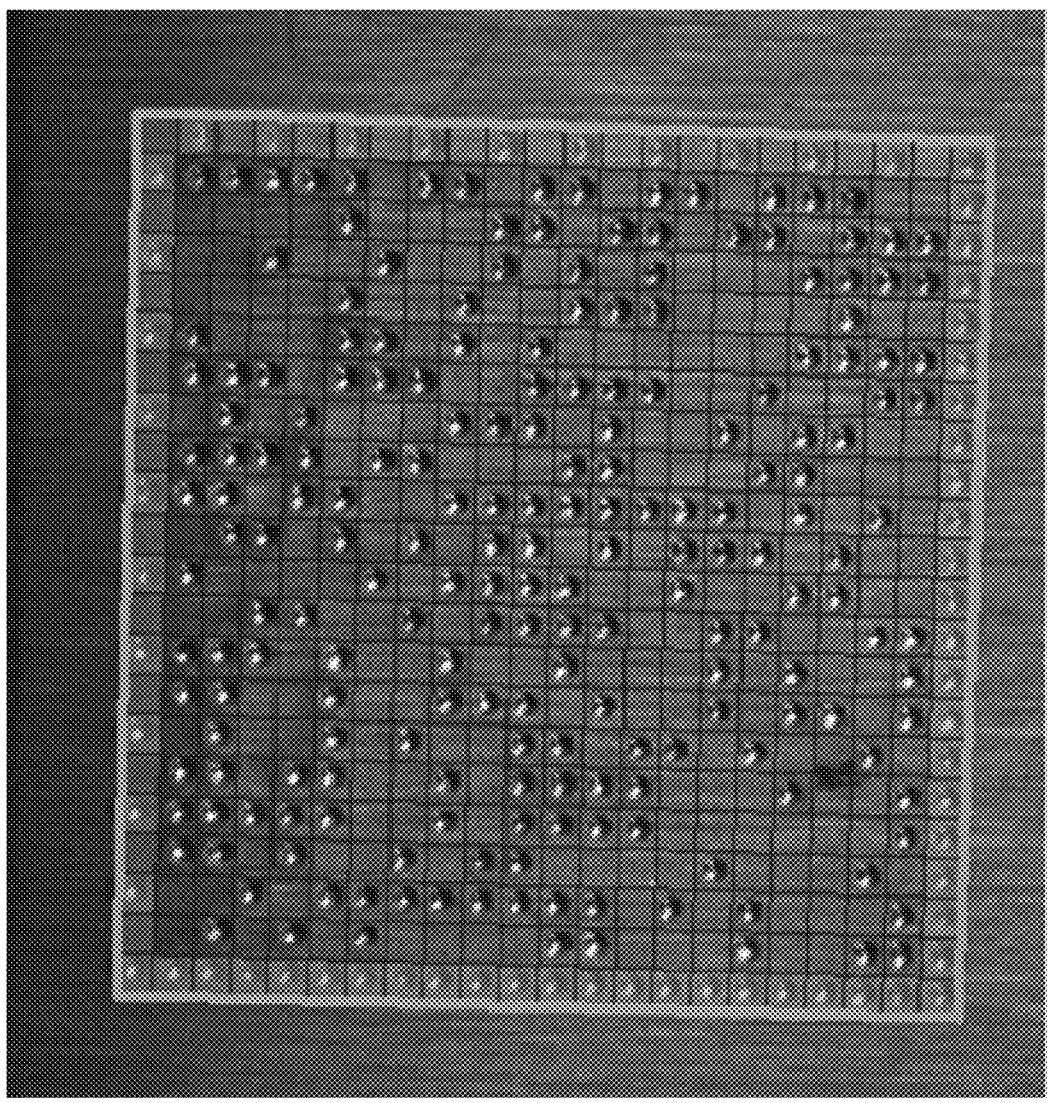
FIG. 18 is an image of a dot-peened machine-readable symbol showing a discrimination of reference cells either containing or not containing a dot peen (COLOR)

Such reference portions of the symbol may be used as reference cells to determine the optical characteristics of the two states of the symbol. FIG. 18 shows the cells that were automatically selected as reference cells. The reference cells with the dot peen are marked with blue and the reference cells without a dot peen are marked in red. In this particular case, only the location edges (right and lower) and the timing edges (left and top) were used. Additional information could have been acquired from the quiet zone that surrounds the symbol. In the case of larger data-matrix symbols, as well as in other types of symbols, there may also be reference structures present in the intermediate region of the symbol, but in this particular case the cells inside the colored edges are unknown states that are determined by the methods of the invention.

The statistical properties of the cells (reference and unknown) may be assessed and summarized in a variety of ways in different embodiments. For example, histograms of the pixel values within each cell for each of the color planes may be generated. The mean, variance, and higher-order statistics of the pixel values for each of the pixels within the cells and each of the color planes may be determined. Spatial descriptors of each cell contents may be summarized with power spectral densities, discrete cosine transforms, wavelets, and other methods of the sort. A variety of textural measures of the cell may be made. Principal-component analysis of the cell contents in the spatial, spectral, or spatio-spectral dimensions may be performed and the results compiled. All of these characterizations may be performed on the raw color data or in alternative color spaces such as L-a-b, YCbCr, etc.

Whatever characterization of the cells are made, these values may be used as features for a subsequent classification step. In the case of the present example, each cell was summarized by the mean and the standard deviation of the values for all pixels within the cell for each of the red, green, and blue color planes. The same summary values were also generated for the corresponding YCbCr data. These twelve values per cell were then used as features for a subsequent classification using linear discriminant analysis (LDA), which is merely one example of classification methods that may be used. Other embodiments, for instance, make use of nonlinear discriminant analysis, AdaBoost, neural networks, K nearest neighbors, and a variety of other methods.

Figure 19:
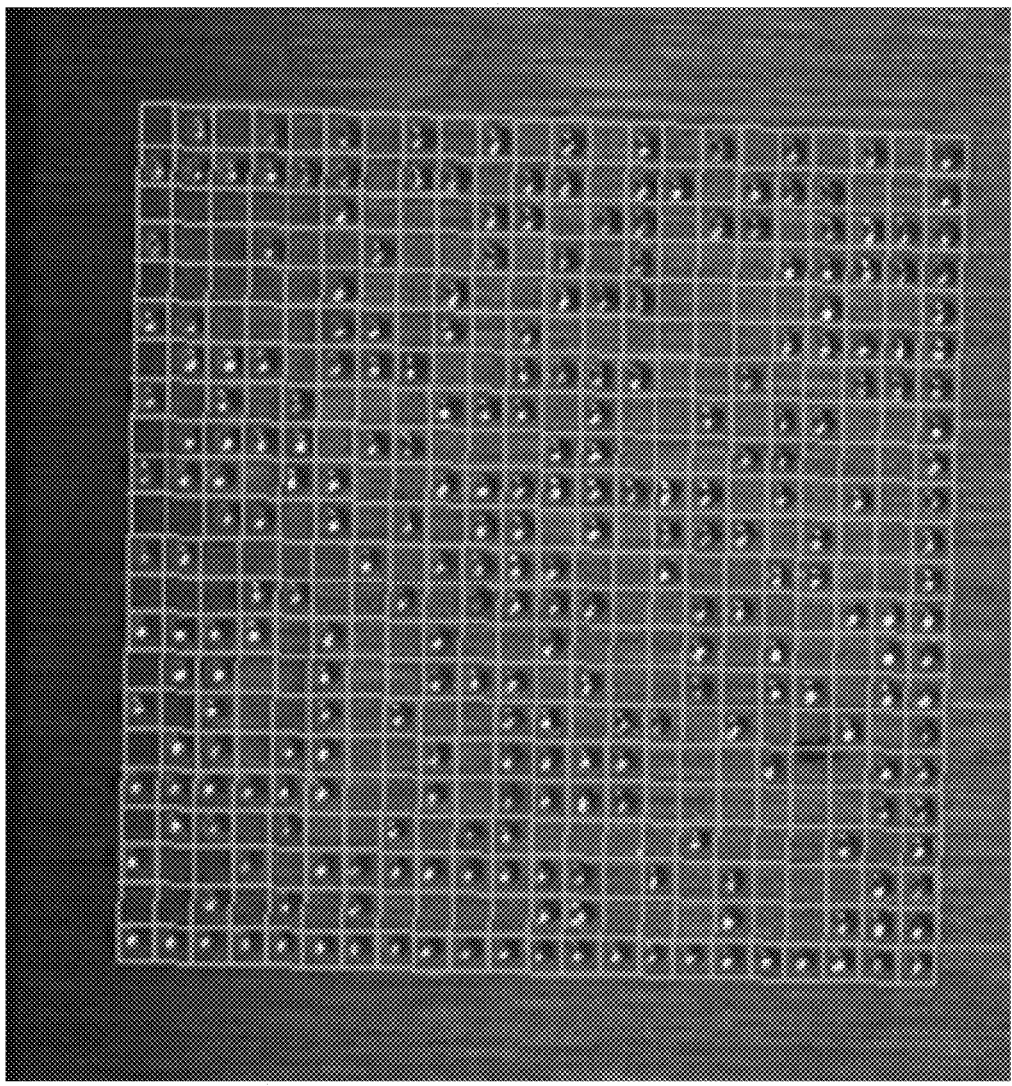
FIG. 19 shows the results of applying a classification method to unknown cells for a dot-peened machine-readable symbol (COLOR)

The features taken from the reference cells may be used to set the parameters of the classifier and to optimize the performance for that symbol. Once the classifier is set or trained, it may then be applied to the unknown cells of the same image, as well as for other such similar images. The result of applying the classifier to unknown cells of the dot-peen symbol is shown in FIG. 19. As can be seen by reviewing the classification results, which used red/blue coloring, as compared to the underlying grayscale image, the results of the classification were 100% accurate.

Once the classification results for each cell are determined, the results may be compiled into a simple binary grid, which may then be subsequently decoded. An additional benefit of the present method is that any existing geometric distortion of the raw data does not need to be explicitly corrected. Rather, the statistical properties of the pixels within a cell may be used to determine the state of the cell, which is then recorded in an appropriate square or rectangular grid (or whatever shape corresponds to the ideal form factor for the symbol under analysis). In so doing, the aspect ratio is removed from the final result without requiring a computationally expensive image-processing procedure.

Figure 20:
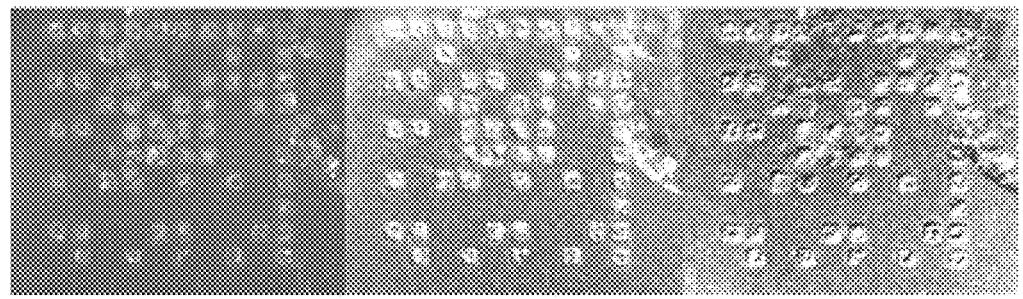
FIG. 20 shows red, green, and blue color planes from an industrial barcode.
Figure 21:
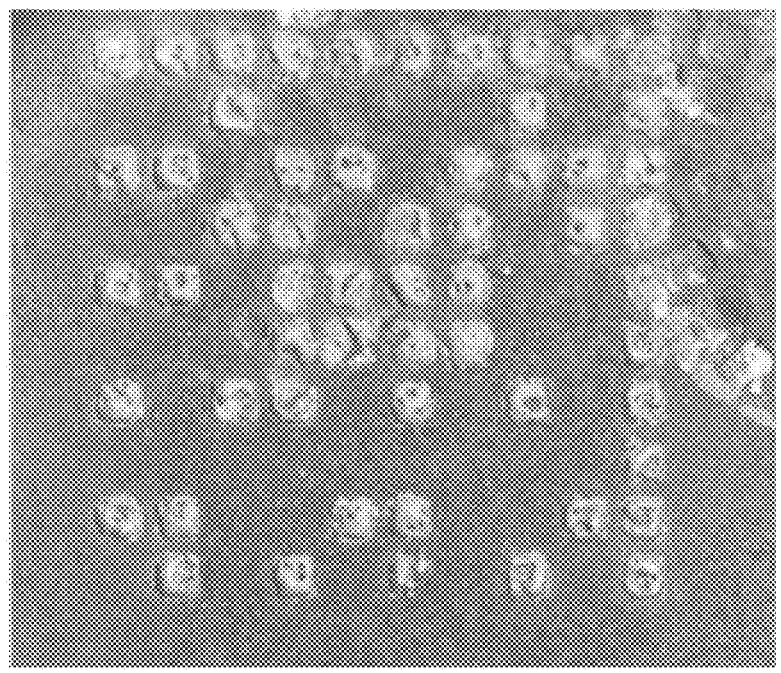
FIG. 21 is a color image generated from the three raw color planes shown in FIG. 20.
Figure 22:
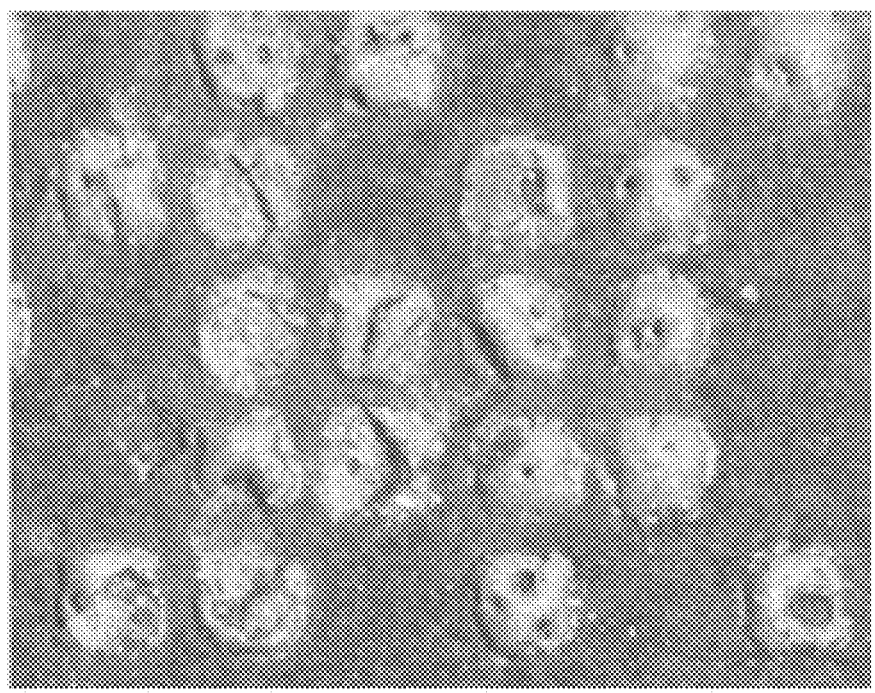
FIG. 22 is a close-up of the central portion of the barcode shown in FIG. 21 (COLOR)

A second example of the methods of the invention is provided with a symbol having poorly formed elements generated from spot welds, as shown in FIGS. 20-22. The same sensor was used for this analysis as described above in connection FIG. 14. Similar to FIG. 14, the left portion of FIG. 20 shows the red color plane (obtained using diffuse red illumination), the central portion of FIG. 20 shows the green color plane (obtained using direct green illumination), and the right portion of FIG. 20 shows the blue color plane (obtained using direct blue illumination). Similar to FIG. 15, the three images may be viewed as a single image in FIG. 21. The close-up of the central portion of the symbol shown in FIG. 22 clearly illustrated the poorly formed elements (in the lower right of the drawing) as well as damage to other elements (in the lower left quadrant of FIG. 22).

Figure 23:
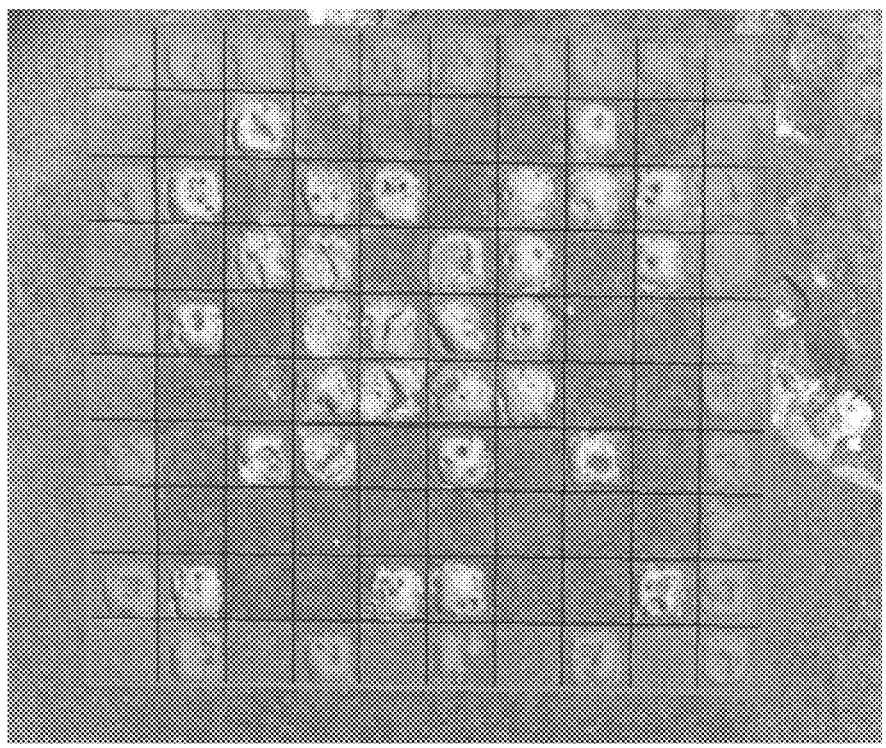
FIG. 23 shows reference cells of the industrial barcode of FIG. 20 used for subsequent classification (COLOR)
Figure 24:
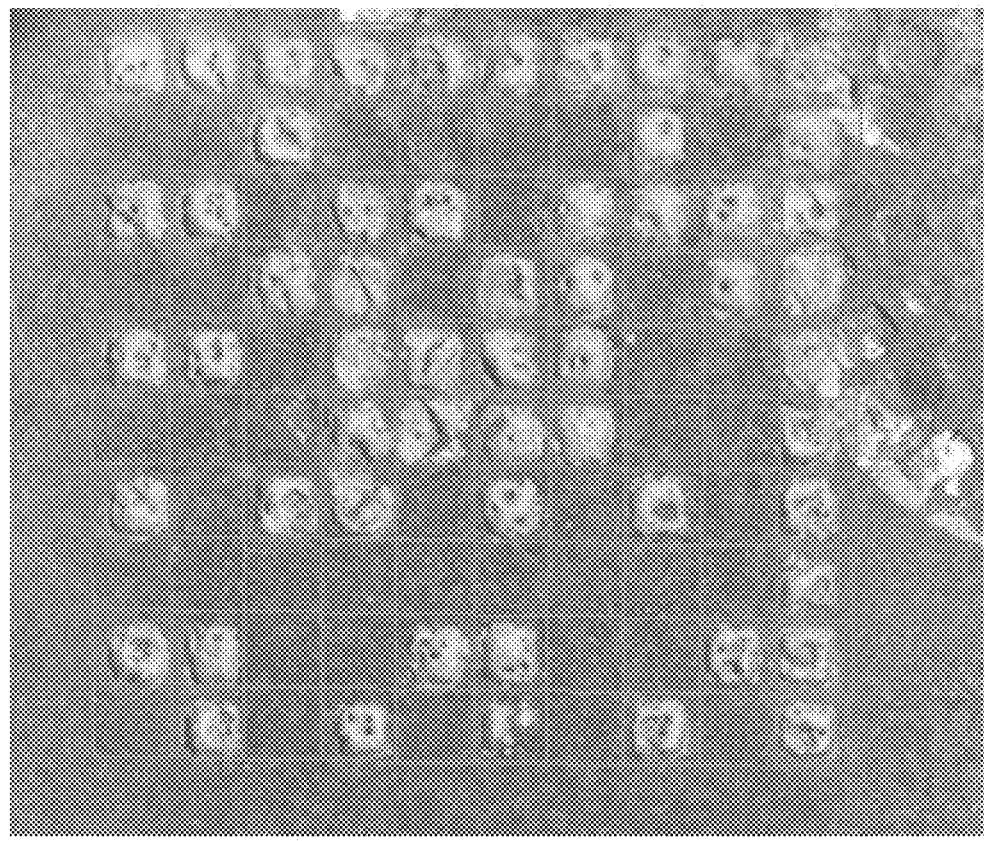
FIG. 24 shows the results of applying a statistical classification technique to the industrial barcode of FIG. 20 (COLOR)

The same procedure for statistical interpretation of the symbol pattern as described above was applied also to this symbol. In this case, the reference cells are shown color-coded in FIG. 23, with results of the classification shown in FIG. 24. The classification results are again correct, and the resulting binary image decoded without errors.

c. Copy-Resistant Symbols

Embodiments of the invention are also directed to machine-readable symbols that are copy-resistant. Such copy-resistance may be effected by incorporating an optically variable material, which may be comprised by symbol itself, by the substrate on or in which the symbol is instantiated, or by a supplementary layer. Examples of supplementary layers that may be provided include a laminate, coating, or other covering layer that is generally coextensive with the symbol, although layers that are not coextensive may also be used in some embodiments.

In addition, at least one of the machine-readable symbol, the substrate, and the supplementary layer (if present) comprises a security feature, defined above as referring to an identifying marking that takes the form of words, symbols, patterns, colors, textures, fiducial marks, surface finishes, and the like.

Figure 25:
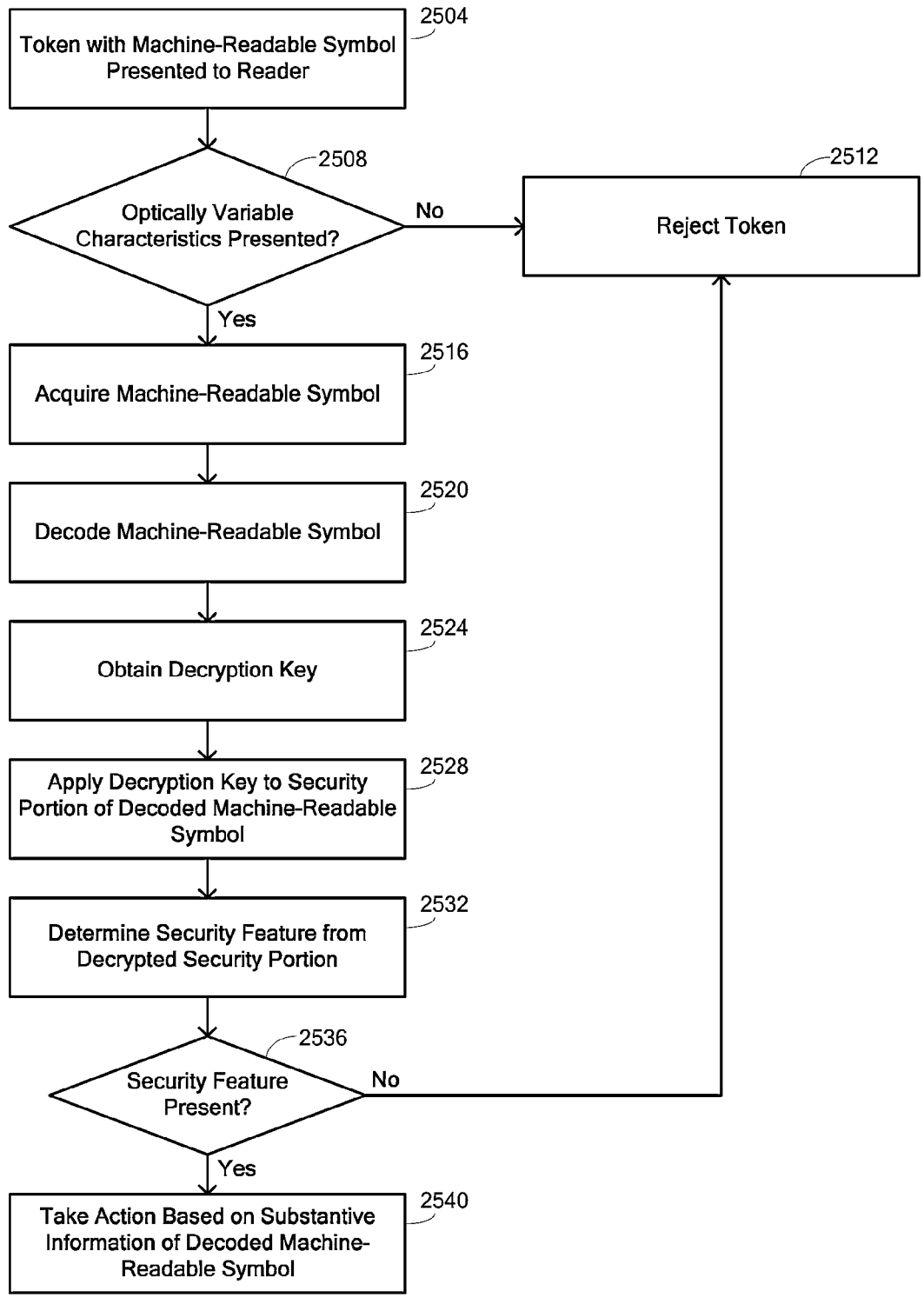
FIG. 25 is a flow diagram that summarizes methods of the invention for reading copy-resistant machine-readable symbols in accordance with some embodiments.

Methods of rendering the machine-readable symbol copy-resistant are illustrated with the flow diagram of FIG. 25. While the flow diagram sets forth a number of steps explicitly and provides an illustration of those steps in a particular order, neither of these is intended to be limiting; in alternative embodiments, some of the steps may be omitted, additional steps not specifically called out may be performed, and/or some of the steps may be performed in an order that is different from that illustrated. In discussing FIG. 25 below, comments are also made with respect to FIG. 26, which provides a schematic illustration of a structure for a copy-resistant symbol. While the example is shown in the form of a two-dimensional barcode, it will be understood by those of skill in the art that the same principles may be applied to other types of machine-readable symbols discussed herein.

According to embodiments of the invention, the machine-readable symbol includes both substantive information and security information, which are collectively encoded into the machine-readable format according to encoding schemes that are readily available. The security information, though, is further encrypted prior to that encoding according to a separate encryption scheme that is preferably "secret" in the sense that it is known only by a limited number of parties who have been authorized to have knowledge of that encryption scheme. Such encryption may use any of a variety of techniques, including both symmetric and asymmetric schemes. For example, the authorized parties may have access to a decryption key that allows for the security-information component to be decrypted. The security information itself includes some specification of the security feature incorporated by the copy-resistant symbol, allowing verification of the presence of the correct security feature.

Thus, in order to read a machine-readable symbol as outlined by the exemplary method of FIG. 25—and to verify that it is not presented as part of a copy of an otherwise legitimate symbol—the symbol is presented to the optical reader at block 2504. At block 2508, an initial check is made whether the symbol includes optically variable characteristics, with the symbol being rejected at block 2512 if it does not. This provides a high-level verification that the symbol at least has the required structure and, in accordance with the structure previously discussed, the optically variable characteristics may be present in the substrate of the symbol, in the machine-readable symbol itself, or in a supplementary layer. In some embodiments, more specific properties of the optically variable characteristics may be required in order to proceed. For instance, a symbol may be considered invalid if it lacks a specific holographic signature, the lack of such a signature suggesting that it may be a nonholographic copy of a genuine symbol.

Figure 26:
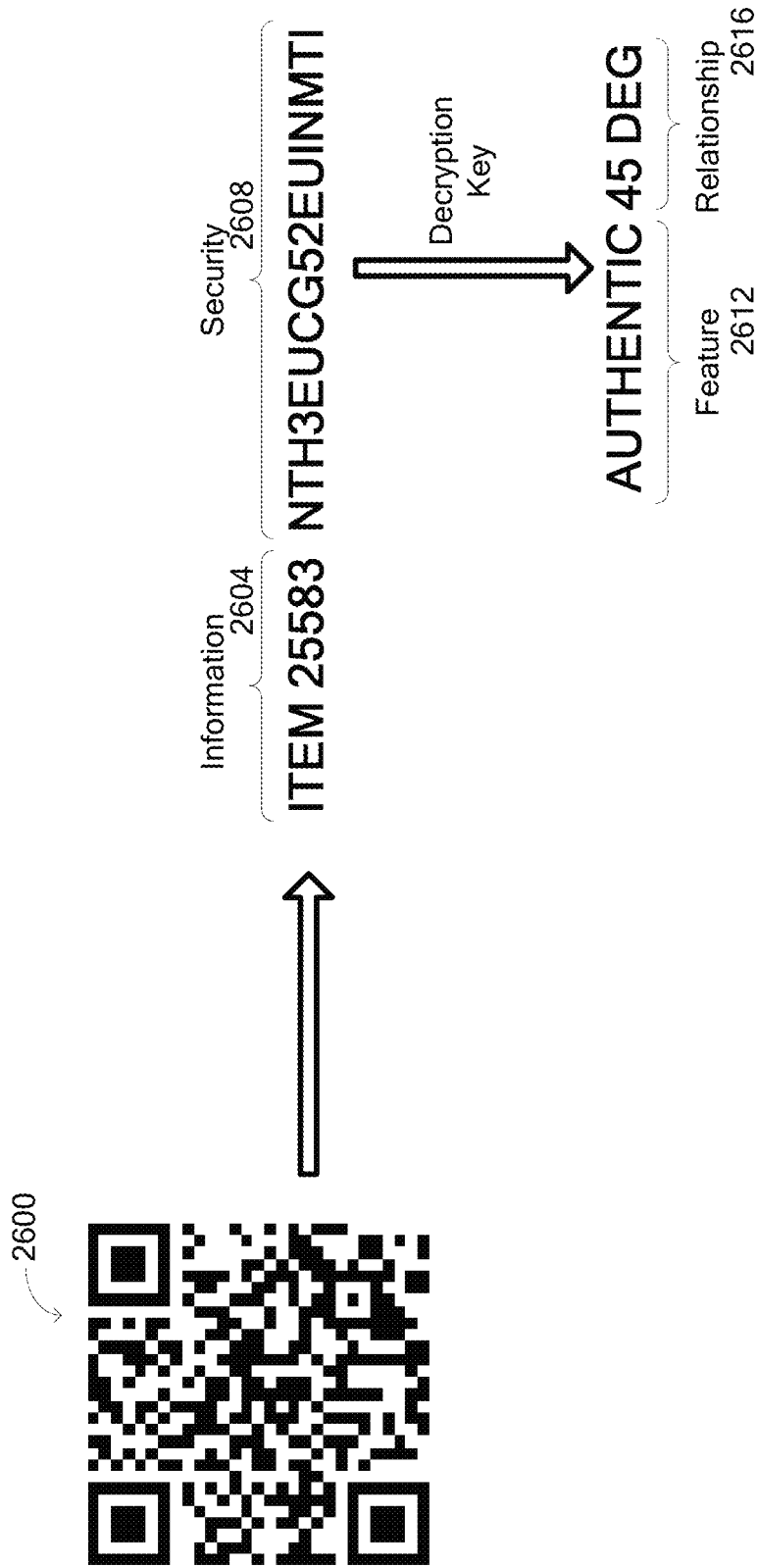
FIG. 26 provides a schematic illustration of how information may be encoded within a machine-readable symbol taking the form of a two-dimensional barcode.

If optically variable characteristics are present, the machine-readable symbol is read by the optical reader at block 2516. Decoding of the machine-readable symbol at block 2520 proceeds by applying the appropriate algorithm in accordance with the particular symbology used to encode the symbol. The effect of this step is illustrated in FIG. 26 with a two-dimensional barcode 2600 that has been decoded to render an alphanumeric string that has both substantive information 2604 and encrypted security information 2608. An attempt is accordingly made to parse the resulting alphanumeric string so that the security information can be decrypted.

At block 2524, the decryption key is obtained. This may be done in a number of different ways in different embodiments. In some cases where the security information 2608 has been encrypted using asymmetric or public-key encryption, the purportedly proper decryption might be maintained in a database that is either publicly or privately available. When it is maintained in a publicly accessible database, the communications system 132 of the optical reader may be used to connect to a network and access the database to retrieve the decryption key. This might be a suitable arrangement, for example, where a manufacturer purchases critical components from a supplier and wishes to authenticate a particular shipment of components by retrieving the vendor's public key as published in a publicly accessible database so that it may then be applied to the message extracted from a symbol present on a just-received shipment. When the key is maintained in a private database, it may be accessible directly to the optical reader by being stored on the storage device 128.

While such a mechanism of maintaining a key is possible with asymmetric encryption, it is expected to be more usual in those embodiments in which symmetric encryption is used. In such embodiments, the common key may be shared between entities using some secure mechanism. In the example of a vendor shipping components to a manufacturer, the two parties might agree to use a particular encryption key for transaction between the two entities. This may advantageously be effected by using a key-sharing algorithm to transmit the key in a secure fashion. One example of such a key-sharing algorithm is the Diffie-Hellman algorithm, in which case some or all of the public elements of the Diffie-Hellman key sharing may be included as an unencrypted part of the encoded machine-readable-symbol message.

Application of the decryption key to the security portion 2608 of the decoded message at block 2528 of FIG. 25 is illustrated in FIG. 26 to resolve the unencrypted message. The unencrypted security message allows for a specification of the security feature of the symbol to be determined at block 2532 of FIG. 25. This may result from any of a variety of formats, one of which is suggested in FIG. 26 for illustrative purposes. In this example, the format specifies that the security feature is the presence of the word "AUTHENTIC" 2612 as part of the optically variable component of the symbol and that the word is inclined at an angle of 45° across the machine-readable symbol as indicated by the resolved relationship information 2616.

Successful decryption of the security information 2608 allows a comparison to be made at block 2536 of FIG. 25 between the feature values specified in the security information with an actual security feature present on the symbol. If the decrypted feature information matches the feature actually present on the symbol, then there is greater confidence that the symbol was produced by an authorized entity and action can be taken at block 2540 with the substantive information contained within the machine-readable symbol. Conversely, if the decryption fails to yield intelligible feature values or if the decrypted feature values do not match the actual features of the symbol from which they were extracted, this an indication that the symbol was either not produced by an authorized entity or was altered in some way, prompting the symbol to be rejected at block 2512.

Figure 27A:
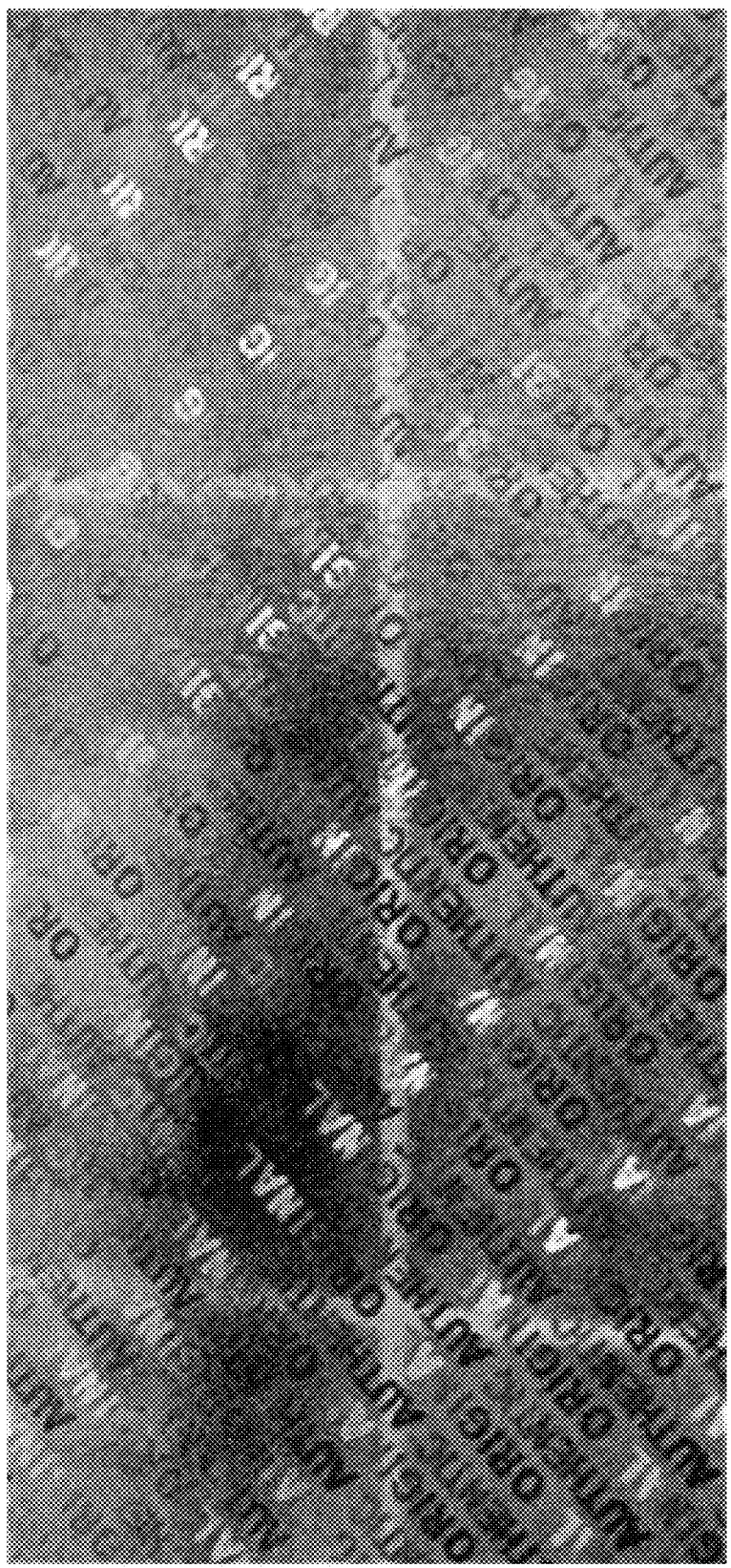
FIG. 27A provides an example of a holographic substrate over which a nonholographic machine-readable symbol may be printed as illustrated in FIG. 27B (COLOR)

There are numerous features that may be used as security features in different embodiments. Indeed, the availability of such numerous features increases the resistance to copying since it is not apparent to unauthorized parties which feature is the actual security feature. FIG. 27A shows an example of a symbol substrate that is holographic. In this example, this substrate has the words "AUTHENTIC" and "ORIGINAL" printed on it, but more generally a holographic substrate may have any words, symbols, patterns, scenes, or other marks printed on it, only a subset of which might be the true security features.

Figure 27B:
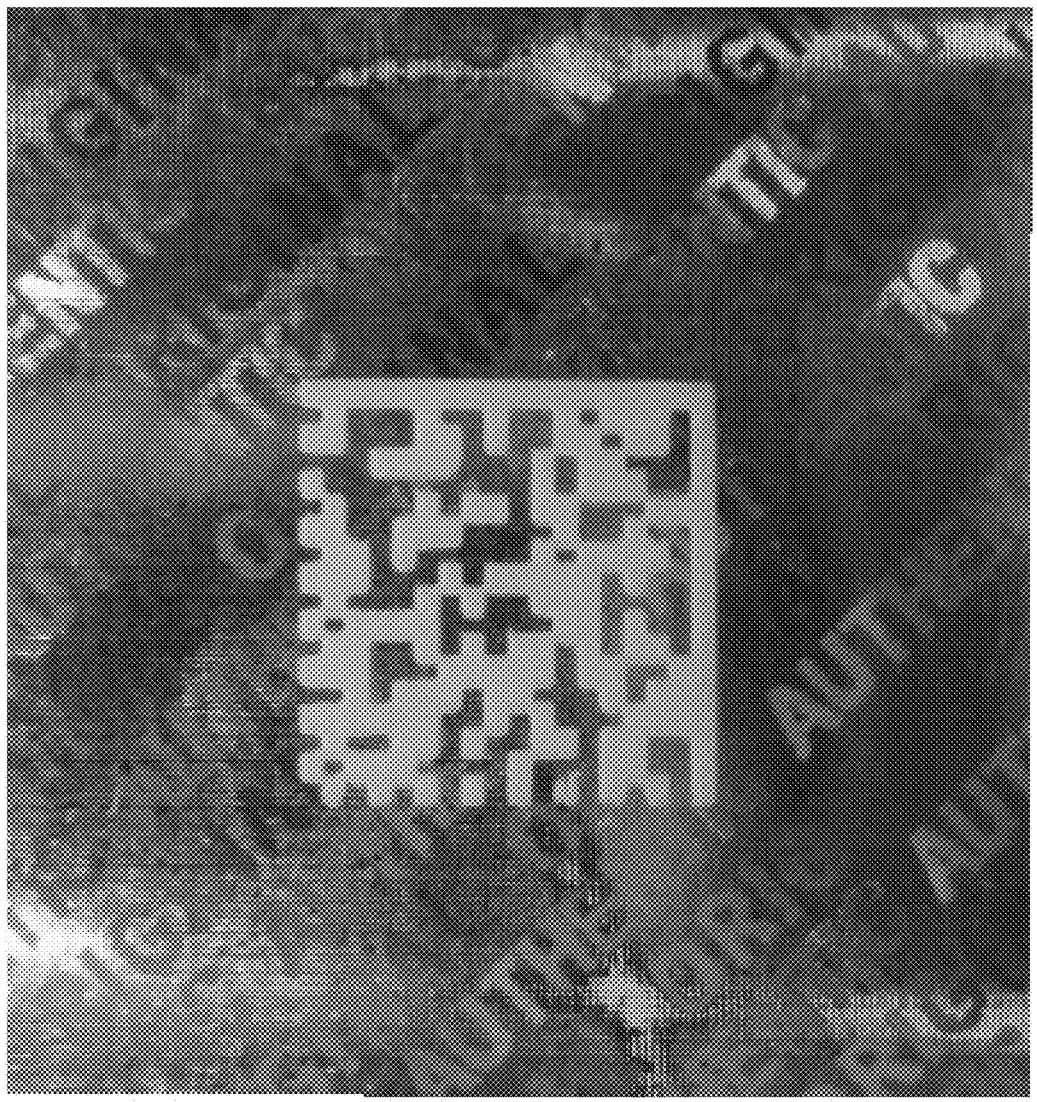

FIG. 27B shows an example of a machine-readable symbol in the form of a two-dimensional barcode printed over the substrate of FIG. 27A. In this example, the barcode was printed with a thermal heat-transfer process, but a variety of other printing processes could alternatively be used.

Figure 28:
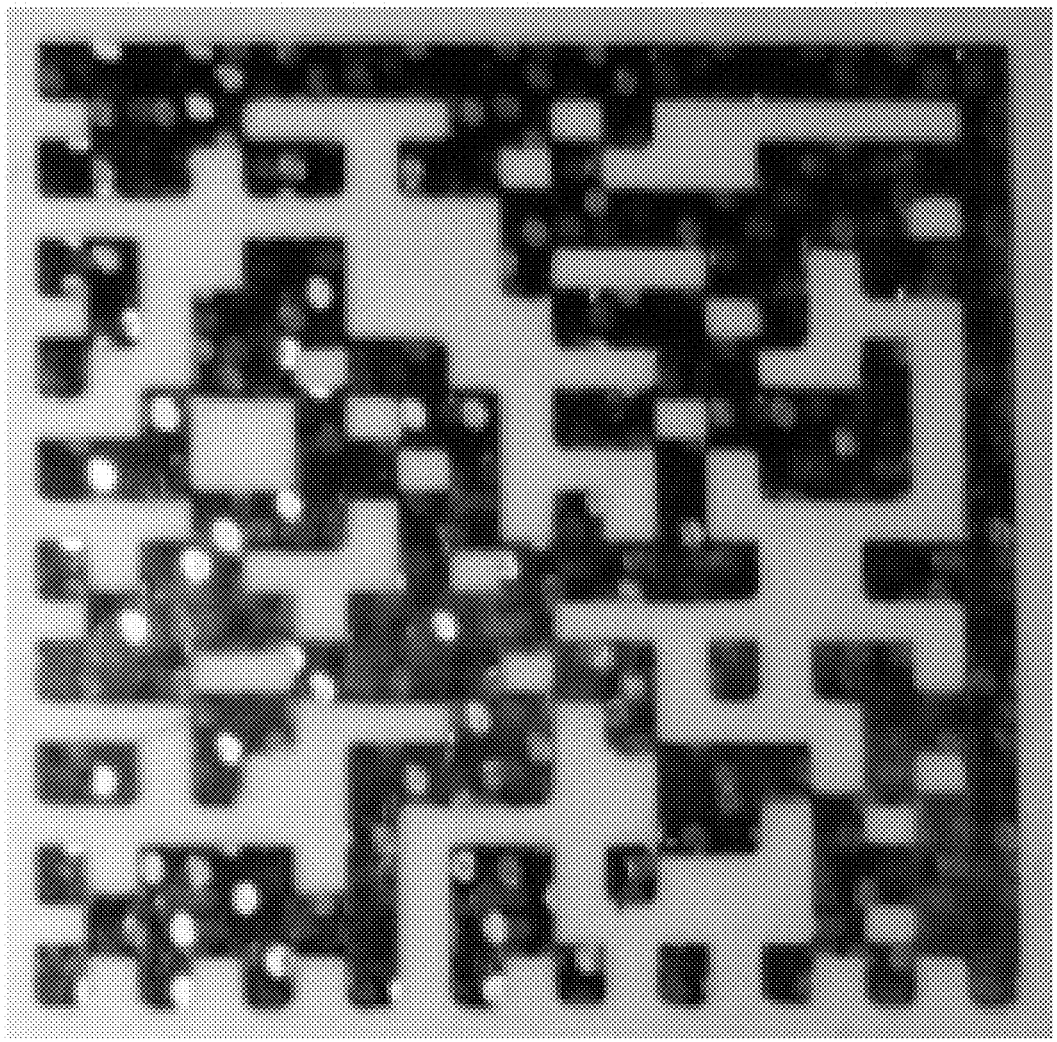
FIG. 28 provides an example of a symbology that uses a holographic machine-readable symbol printed over a nonholographic substrate (COLOR)

FIG. 28 illustrates the converse of an opaque barcode printed over a holographic substrate by showing an example where the substrate is nonholographic and the barcode itself is holographic. In this example, the barcode material is a holographic heat-transfer material that is available commercially. This example also illustrates the use of a pattern of dots as a security feature rather than the presence of words in the holograms of FIGS. 27A and 27B. The size, shape, spacing, and/or color of the dots are examples of characteristics that may be used as a security feature, with information regarding such characteristics provided as part of the security information encoded within the barcode as described above.

The substrate in this example is, moreover, substantially uniform in color with no explicit printing of words, symbols, textures, or other marks. In other embodiments, the substrate could additionally contain such words, symbols, colors, textures, patterns, or other marks, some or all of which could also be used as part of the security feature. In still other embodiments, both the machine-readable symbol and the substrate could be holographic with differing characteristics.

Alternatively or in addition to describing the security feature itself, a feature type or category may be used. For example, the opaque barcode of FIG. 27B is generally white in color and may be designated as "Type 37" while a similar barcode produced with read opaque heat-transfer ribbon could be designated as "Type 38" and the barcode illustrated in FIG. 28 could be designated as "Type 67." In this way, multiple different characteristics of different instantiations of machine-readable symbols may be grouped into a single type designator, with available databases then being used to look up specific features and/or images of representative instantiations of a certain type.

Figure 29B:
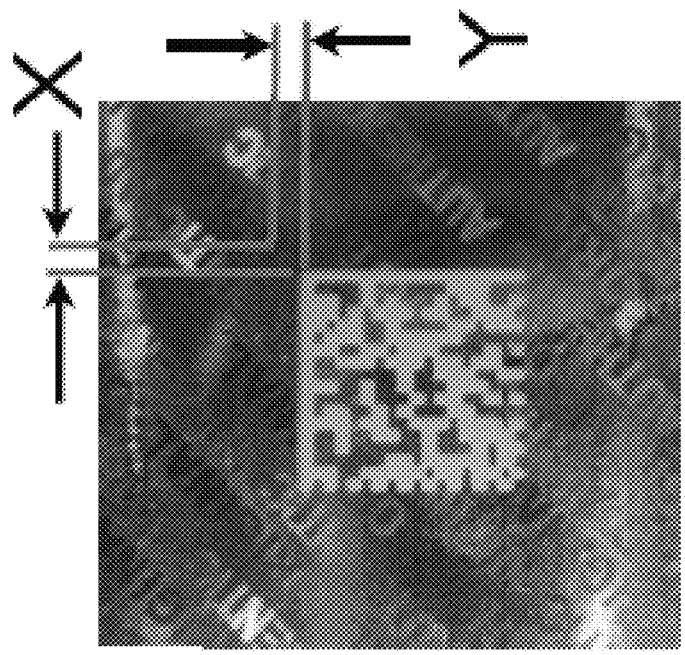
FIGS. 29A and 29B provide examples of spatial relationships between elements of a copy-resistant machine-readable symbol that may be used as features according to embodiments of the invention (COLOR).
Figure 29A:
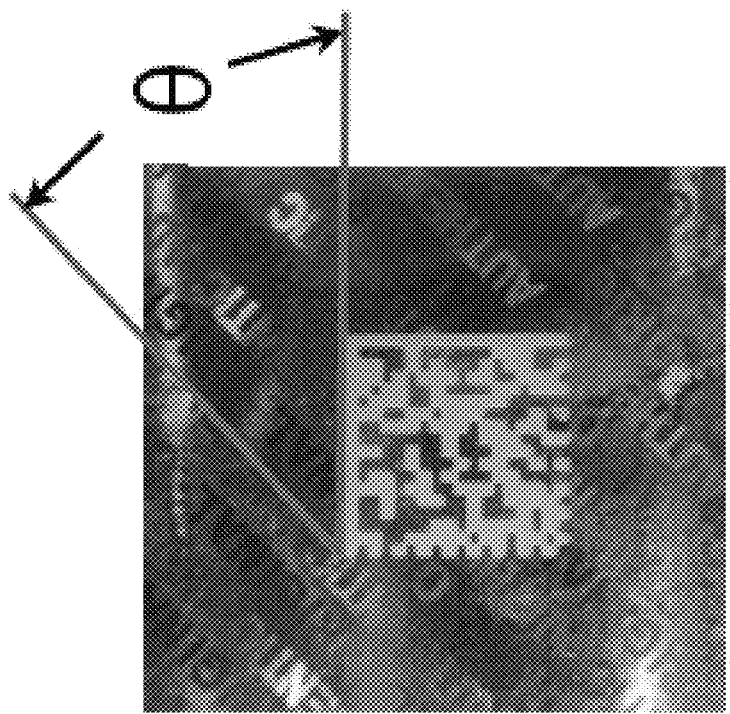

In addition, spatial relationships between different elements of the symbol may be used as features. This is illustrated in FIGS. 29A and 29B for symbols of the type shown in FIG. 27B, i.e. for an opaque white two-dimensional barcode printed on a holographic substrate. In FIG. 29A, the angle θ of the marks on the substrate relative to a reference line defined by the machine-readable symbol may be used as a feature. Such a feature was used as part of the example in FIG. 26 above, in which the word "AUTHENTIC" needed to be inclined at an angle of 45° in order to be valid as a security feature.

Similarly, the displacement of some point on the machine-readable symbol relative to some mark on the substrate may be used as part of the security feature. This is illustrated in FIG. 29B for a Cartesian displacement (X, Y). Any such spatial relationship between different elements of the symbol may be used as features, both between different components of the symbol—i.e. between points on the machine-readable symbol and substrate, between points on the machine-readable symbol and supplementary layer, or between points on the substrate and supplementary layer. Fiducial or registration marks may accordingly be included within the symbol to facilitate such feature measurements.

To increase the robustness of such spatial measurements, it may be advantageous to maintain relatively large step sizes between different possible configurations, although the appropriate size steps may depend on both manufacturing capabilities and on resolution capabilities of optical readers to be used in scanning the symbols. Merely by way of example, angular measurements may be limited to possible angles of 0°, 45°, 90°, 135°, 180°, 225°, 270°, and 315°, which would be relative easy to determine and to distinguish. In a similar manner, the linear displacement between reference points might be coarsely described by which octant a fiducial mark is to be found in relative to the machine-readable symbol or other identifying position using compass directions: N, NW, W, SW, S, SE, E, or NE. Alternatively, the displacement could be described in terms of physical units (e.g. inches, mm, etc.) using Cartesian, polar, or other coordinate systems. In any case, the linear and angular displacement step sizes are preferable chosen to be unambiguously measured and validated in order for these features to be most effective.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A multimode machine-readable symbol comprising:
   a first machine-readable symbol instantiated on an object at a first location, the first machine-readable symbol readable by a first methodology; and
   a second machine-readable symbol instantiated on the object at a second location that at least partially overlaps the first location, the second machine-readable symbol readable by a second methodology different from the first methodology, wherein at least one of said first and second methodologies is one of a topographic methodology and a polarization methodology.

2. The multimode machine-readable symbol recited in claim 1 further comprising a third machine-readable symbol instantiated on the object at a third location that overlaps the first and second locations, the third machine-readable symbol readable by a third methodology different from the first and second methodologies.

3. The multimode machine-readable symbol recited in claim 1 wherein the second machine-readable symbol comprises a pattern of marks formed in a surface of the object.

4. The multimode machine-readable symbol recited in claim 3 wherein the first machine-readable symbol comprises a barcode printed on the surface of the object.

5. The multimode machine-readable symbol recited in claim 3 wherein the first machine-readable symbol comprises a barcode printed on a conformal layer applied over the surface of the object.

6. The machine-readable symbol recited in claim 1, wherein said second machine-readable symbol comprises topographic features formed in a substrate beneath said machine-readable symbol.

7. The machine-readable symbol recited in claim 1, wherein said second machine-readable symbol comprises topographic features combined together with said first machine-readable symbol.

8. The machine-readable symbol recited in claim 1, wherein said first machine-readable symbol and said second machine-readable symbol are combined to define a code of higher order than binary.

9. A method of decoding a multimode machine-readable symbol having a first machine-readable symbol instantiated on an object at a first location and a second machine-readable symbol instantiated on the object at a second location that at least partially overlaps the first location, the method comprising:
- acquiring an image of the multimode machine-readable symbol;
- processing the image to separately evaluate first and second characteristics of the image, wherein the first characteristics arise from the first machine-readable symbol and the second characteristics arise from the second machine-readable symbol;
- applying a first methodology to decode the first machine-readable symbol from the evaluated first characteristics; and
- applying a second methodology to decode the second machine-readable symbol from the second evaluated characteristics, wherein at least one of said first and second methodologies is one of a topographic methodology and a polarization methodology.

10. The method recited in claim 9 wherein the first and second methodologies are different.

11. The method recited in claim 9 wherein:
- the first characteristics comprise reflectance characteristics; and
- the second characteristics comprise topographic characteristics.

12. The method recited in claim 9 wherein processing the image comprises applying a photometric stereo technique to the image.

13. The method recited in claim 9 wherein:
- the multimode machine-readable symbol further has a third machine-readable symbol instantiated on the object at a third location that overlaps the first and second locations; and
- processing the image comprises separately evaluating third characteristics of the image, wherein the third characteristics arise from the third machine-readable symbol,
- the method further comprising applying a third methodology to decode the third machine-readable symbol from the third evaluated characteristics.

14. The method in claim 9, wherein said second machine-readable symbol comprises topographic features formed in a substrate beneath said machine-readable symbol.

15. The method recited in claim 9, wherein said second machine-readable symbol comprises topographic features combined together with said first machine-readable symbol.

16. The method recited in claim 9, wherein said first machine-readable symbol and said second machine-readable symbol are combined to define a code of higher order than binary.

* * * * *